US012782839B2

(12) United States Patent
Sato

(10) Patent No.: US 12,782,839 B2
(45) Date of Patent: Nov. 3, 2026

(54) LIGHT SCANNING APPARATUS AND IMAGE FORMING APPARATUS

(71) Applicant: CANON KABUSHIKI KAISHA, Tokyo (JP)

(72) Inventor: Ryota Sato, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 18/884,361

(22) Filed: Sep. 13, 2024

(65) Prior Publication Data

US 2025/0110418 A1 Apr. 3, 2025

(30) Foreign Application Priority Data

Sep. 28, 2023 (JP) ................................ 2023-166647

(51) Int. Cl.
*G03G 15/04* (2006.01)
*G06K 15/12* (2006.01)

(52) U.S. Cl.
CPC . *G03G 15/04036* (2013.01); *G03G 15/04072* (2013.01); *G06K 15/1219* (2013.01); *G06K 15/1228* (2013.01); *G06K 15/1238* (2013.01); *G03G 2215/0404* (2013.01)

(58) Field of Classification Search
CPC ......... G03G 15/0409; G03G 15/04036; G03G 15/04072; G03G 2215/0404; G06K 15/1219; G06K 15/1228; G06K 15/1238
USPC ........ 399/118; 347/229, 234, 235, 242, 248, 347/250, 257, 261, 163
See application file for complete search history.

(56) References Cited

U.S. PATENT DOCUMENTS 7,446,910 B2 11/2008 Tamaru
10,185,242 B2 * 1/2019 Nagatoshi .............. G03G 15/50
2015/0205097 A1 * 7/2015 Kudo .................. G03G 15/043 359/204.1
2016/0070196 A1 * 3/2016 Park ...................... G02B 26/12 347/118
2021/0080712 A1 * 3/2021 Tanaka ................. G02B 26/127
2025/0110419 A1 * 4/2025 Sato ..................... G02B 26/123

FOREIGN PATENT DOCUMENTS

JP 2005062516 A 3/2005

* cited by examiner

*Primary Examiner* — Robert B Beatty
(74) *Attorney, Agent, or Firm* — ROSSI, KIMMS & McDOWELL LLP

(57) ABSTRACT

A light scanning apparatus according to the present embodiments includes a deflecting unit configured to deflect a first light flux to scan a first scanned surface in a main scanning direction, a first imaging optical system configured to guide the first light flux deflected by the deflecting unit to the first scanned surface, a light receiving element configured to receive the first light flux deflected by the deflecting unit without the first imaging optical system, a first optical element configured to guide the first light flux deflected by the deflecting unit to the light receiving element, and a holding member configured to hold the deflecting unit, the first imaging optical system, the light receiving element and the first optical element, in which the first optical element and the deflecting unit are arranged on sides opposite to each other with respect to a first surface of the holding member.

19 Claims, 22 Drawing Sheets

LIGHT SCANNING APPARATUS AND IMAGE FORMING APPARATUS

BACKGROUND

Technical Field

The present disclosure is related to a light scanning apparatus, and more particularly, to a light scanning apparatus suitably used in an image forming apparatus such as a laser beam printer, a digital copying machine, or a multifunction printer.

Description of the Related Art

Conventionally, there is known a light scanning apparatus including an optical element for so-called synchronization detection for controlling writing timing on a scanned surface.

Japanese Patent Application Laid-open No. 2005-62516 discloses a light scanning apparatus in which a light receiving element for receiving a light flux for synchronization detection, and a synchronization detection optical element for guiding the light flux to the light receiving element are arranged on opposite side of a deflecting unit relative to a substrate provided on a predetermined main scanning cross section.

SUMMARY

A light scanning apparatus according to the embodiments includes a deflecting unit configured to deflect a first light flux to scan a first scanned surface in a main scanning direction, a first imaging optical system configured to guide the first light flux deflected by the deflecting unit to the first scanned surface, a light receiving element configured to receive the first light flux deflected by the deflecting unit without the first imaging optical system, a first optical element configured to guide the first light flux deflected by the deflecting unit to the light receiving element, and a holding member configured to hold the deflecting unit, the first imaging optical system, the light receiving element and the first optical element, in which the first optical element and the deflecting unit are arranged on sides opposite to each other with respect to a first surface of the holding member.

Further features of the present disclosure will become apparent from the following description of exemplary embodiments with reference to the attached drawings.

DESCRIPTION OF THE EMBODIMENTS

Hereinafter, a light scanning apparatus according to the present embodiments is described in detail with reference to the accompanying drawings. The drawings described below may be drawn on a scale different from the actual scale in order to facilitate understanding of the present disclosure.

In the following description, a main scanning direction is a direction perpendicular to a rotation axis of a deflecting unit and an optical axis of an imaging optical system (a direction in which a light flux is deflected by the deflecting unit), and a sub-scanning direction is a direction parallel to the rotation axis of the deflecting unit. Further, a main scanning cross section is a cross section perpendicular to the sub-scanning direction, and a sub-scanning cross section is a cross section perpendicular to the main scanning direction.

Further, hereinafter, a direction parallel to the optical axis of the imaging optical system is defined as an X direction, the main scanning direction is defined as a Y direction, and the sub-scanning direction is defined as a Z direction.

First Embodiment

Figure 1A:
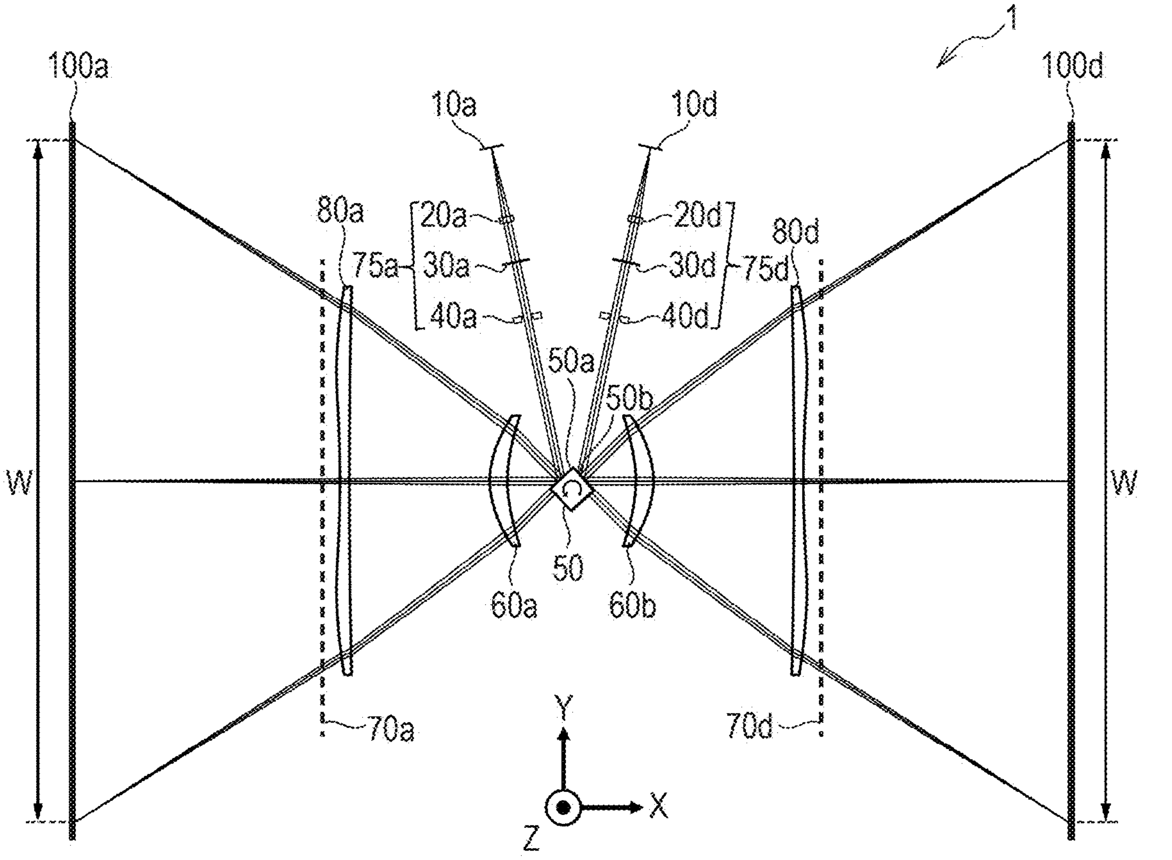
FIG. 1A is a partial developed view in a main scanning cross section of a light scanning apparatus according to a first embodiment of the present invention.
Figure 1B:
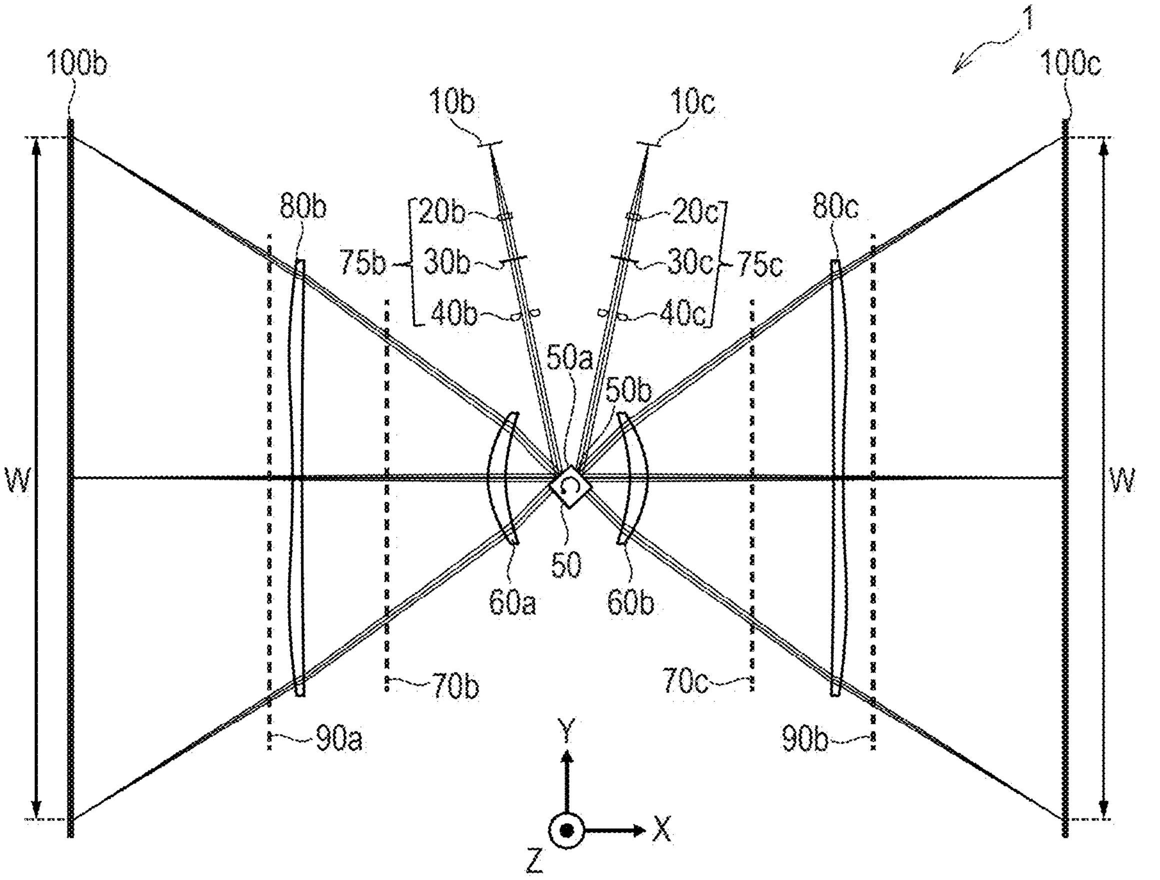
FIG. 1B is a partial developed view in the main scanning cross section of the light scanning apparatus according to the first embodiment.

FIGS. 1A and 1B show partial developed views in a main scanning cross section of a light scanning apparatus 1 according to a first embodiment of the present invention.

Figure 2A:
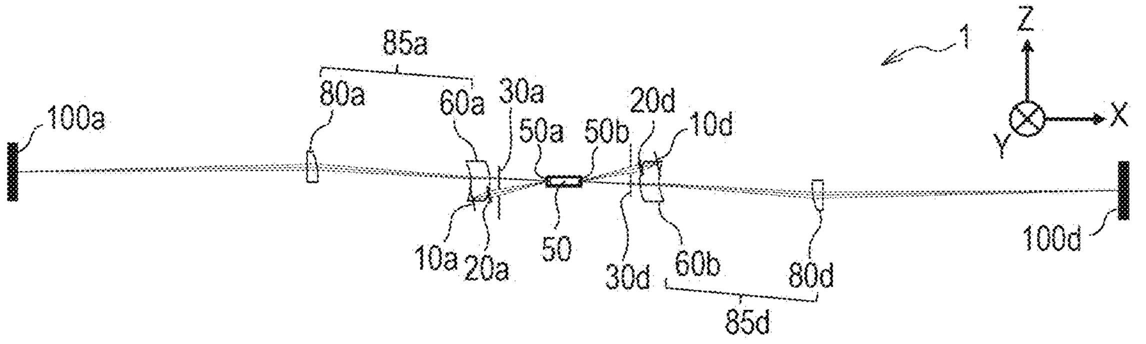
FIG. 2A is a partial developed view in a sub-scanning cross section of the light scanning apparatus according to the first embodiment.
Figure 2B:
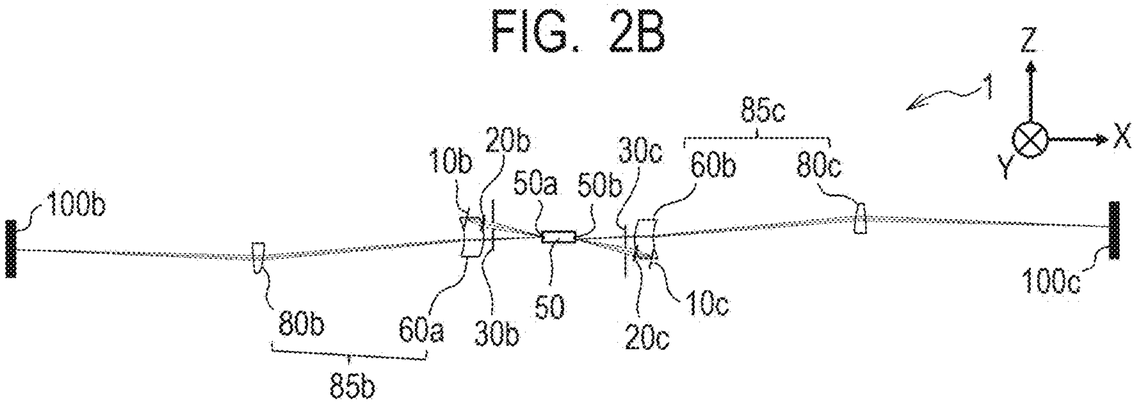
FIG. 2B is a partial developed view in the sub-scanning cross section of the light scanning apparatus according to the first embodiment.

Further, FIGS. 2A and 2B show partial developed views in a sub-scanning cross section of the light scanning apparatus 1 according to the first embodiment.

Figure 2C:
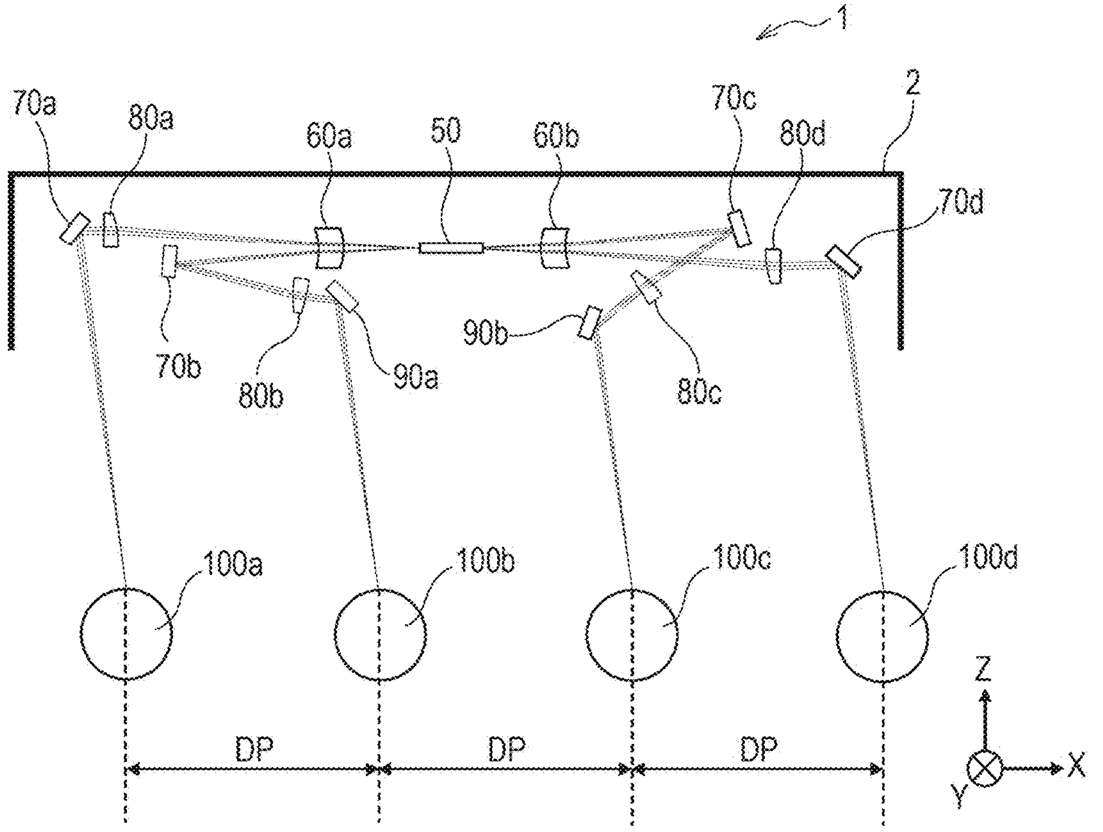
FIG. 2C is a partial sub-scanning cross sectional view of the light scanning apparatus according to the first embodiment.

Furthermore, FIG. 2C shows a partial sub-scanning cross sectional view of the light scanning apparatus 1 according to the first embodiment.

Specifically, FIGS. 1A and 2A illustrate a first incident optical system 75*a* and a first imaging optical system 85*a* which are configured to guide a first light flux LA to a first scanned surface 100*a*.

Further, FIGS. 1A and 2A illustrate a fourth incident optical system 75*d* and a fourth imaging optical system 85*d* which are configured to guide a fourth light flux LD to a fourth scanned surface 100*d*.

In addition, specifically, FIGS. 1B and 2B illustrate a second incident optical system 75*b* and a second imaging optical system 85*b* which are configured to guide a second light flux LB to a second scanned surface 100*b*.

Further, FIGS. 1B and 2B illustrate a third incident optical system 75*c* and a third imaging optical system 85*c* which are configured to guide a third light flux LC to a third scanned surface 100*c*.

Note that first reflecting elements (reflecting optical elements) 70*a*, 70*b*, 70*c* and 70*d*, and second reflecting elements (reflecting optical elements) 90*a* and 90*b* are shown by broken lines in FIGS. 1A and 1B, whereas are not shown in FIGS. 2A and 2B.

The light scanning apparatus 1 according to the present embodiment includes a housing 2 (a holding member), first, second, third and fourth light sources 10*a*, 10*b*, 10*c* and 10*d*, and first, second, third and fourth incident optical elements 20*a*, 20*b*, 20*c* and 20*d*.

The light scanning apparatus 1 according to the present embodiment includes first, second, third and fourth sub-scanning stops 30*a*, 30*b*, 30*c* and 30*d*, and first, second, third and fourth main scanning stops 40*a*, 40*b*, 40*c* and 40*d*, and a deflecting unit 50.

The light scanning apparatus 1 according to the present embodiment includes first imaging optical elements 60*a* and 60*b*, and first reflecting elements 70*a*, 70*b*, 70*c* and 70*d*.

The light scanning apparatus 1 according to the present embodiment includes second imaging optical elements 80*a*, 80*b*, 80*c* and 80*d*, and second reflecting elements 90*a* and 90*b* (second optical elements).

Figure 3A:
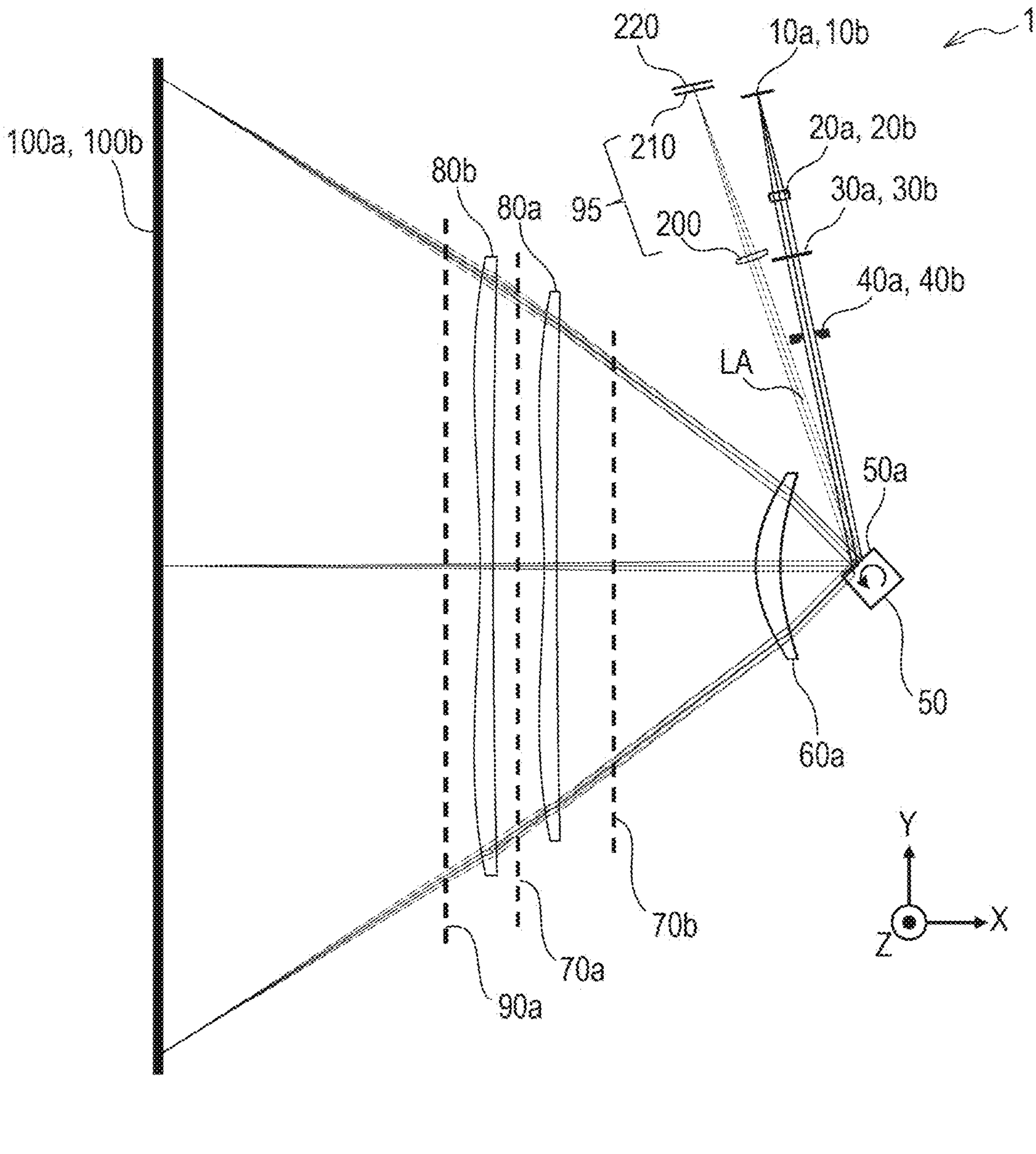
FIG. 3A is a partial developed view in the main scanning cross section of the light scanning apparatus according to the first embodiment.

Further, the light scanning apparatus 1 according to the present embodiment includes a synchronization detection lens 200 (a first optical element, a refracting optical element), a synchronization detection slit 210 and a synchronization detection sensor 220 (a light receiving element) (see FIG. 3A).

The light scanning apparatus 1 according to the present embodiment adopts a so-called both-side scanning system configured to scan first and second scanned surfaces 100*a* and 100*b*, and third and fourth scanned surfaces 100*c* and 100*d* provided on an opposite side of the first and second scanned surfaces 100*a* and 100*b* with respect to the deflecting unit 50 in the main scanning cross section.

The housing 2 includes a box portion having an internal space in which each optical element provided in the light scanning apparatus 1 according to the present embodiment is placed, and a lid portion for covering the internal space from a top of the box portion, and is configured to accommodate the respective optical elements while holding them.

The first to fourth light sources 10*a* to 10*d* are light sources such as semiconductor lasers each of which has two light emitting points. That is, the light scanning apparatus 1 according to the present embodiment is provided with a total of eight light emitting points.

The first light source 10*a* and the second light source 10*b* are arranged at the same positions in the main scanning cross section, whereas are arranged at different positions in the sub-scanning direction.

The third light source 10*c* and the fourth light source 10*d* are arranged at the same positions in the main scanning cross section, whereas are arranged at different positions in the sub-scanning direction.

Each of the first to fourth incident optical elements 20*a* to 20*d* is an anamorphic lens having different refractive powers between the main scanning cross section and the sub-scanning cross section.

Then, the first to fourth incident optical elements 20*a* to 20*d* convert the first to fourth light fluxes LA to LD emitted from the first to fourth light sources 10*a* to 10*d* into parallel light fluxes in the main scanning direction, respectively. Note that the parallel light flux includes not only a strictly parallel light flux but also a substantially parallel light flux such as a weakly divergent light flux or a weakly convergent light flux.

Further, the first to fourth incident optical elements 20*a* to 20*d* condense the first to fourth light fluxes LA to LD emitted from the first to fourth light sources 10*a* to 10*d* toward the deflecting unit 50 in the sub-scanning direction, respectively.

The first to fourth sub-scanning stops 30*a* to 30*d* have a rectangular opening portion, and limit light flux diameters in the sub-scanning direction of the first to fourth light fluxes LA to LD that have passed through the first to fourth incident optical elements 20*a* to 20*d*, respectively.

The first to fourth main scanning stops 40*a* to 40*d* have a rectangular opening portion, and limit light flux diameters in the main scanning direction of the first to fourth light fluxes LA to LD that have passed through the first to fourth sub-scanning stops 30$a$ to 30$d$, respectively.

The deflecting unit 50 is a polygon mirror (a rotary polygon mirror) having four deflecting surfaces, and rotates at a constant speed in a direction of an arrow illustrated in FIGS. 1A and 1B by a driving unit such as a motor (not shown).

Each of the first imaging optical elements 60$a$ and 60$b$, and the second imaging optical elements 80$a$ to 80$d$ is an fθ lens (a scanning lens) having an fθ characteristic.

Then, the first imaging optical element 60$a$ and the second imaging optical element 80$a$ condense (guide) the first light flux LA deflected by the deflecting unit 50 onto a scanning region (an image forming region) of the first scanned surface 100$a$ to form a spot image on the scanning region.

Further, the first imaging optical element 60$a$ and the second imaging optical element 80$b$ condense (guide) the second light flux LB deflected by the deflecting unit 50 onto a scanning region of the second scanned surface 100$b$, to form a spot image on the scanning region.

Furthermore, the first imaging optical element 60$b$ and the second imaging optical element 80$c$ condense (guide) the third light flux LC deflected by the deflecting unit 50 onto a scanning region of the third scanned surface 100$c$ to form a spot image on the scanning region.

In addition, the first imaging optical element 60$b$ and the second imaging optical element 80$d$ condense (guide) the fourth light flux LD deflected by the deflecting unit 50 onto a scanning region of the fourth scanned surface 100$d$ to form a spot image on the scanning region.

The first reflecting elements 70$a$ to 70$d$ and the second reflecting elements 90$a$ and 90$b$ are elongated mirrors that have no refractive power to bend optical paths of the first to fourth light fluxes LA to LD deflected by the deflecting unit 50 in the sub-scanning cross section.

Each of the first to fourth incident optical elements 20$a$ to 20$d$, the first imaging optical elements 60$a$ and 60$b$, and the second imaging optical elements 80$a$ to 80$d$ provided in the light scanning apparatus 1 according to the present embodiment is a molded lens formed by injection-molding a plastic material.

However, the present invention is not limited thereto, and they may be molded lenses formed by injection-molding of a glass material.

In the light scanning apparatus 1 according to the present embodiment, it is possible to improve productivity and optical performance by using a molded lens in which an optical surface having an aspherical shape can be easily formed and which is suitable for mass production.

Further, the first reflecting elements 70$a$ to 70$d$, and the second reflecting elements 90$a$ and 90$b$ provided in the light scanning apparatus 1 according to the present embodiment are elongated mirrors formed by forming a film of a reflecting surface on a general elongated glass, but are not limited thereto.

That is, they may be elongated mirrors formed by forming a film of a reflecting surface on a member formed by injection-molding a plastic material, or by mirror-finishing a metal member such as aluminum.

In addition, in the light scanning apparatus 1 according to the present embodiment, the reflecting surfaces included therein are formed in a planar shape having no refractive power, but are not limited thereto, and may be formed in a curved surface shape such as a spherical surface.

The first and second light fluxes LA and LB emitted from the first and second light sources 10$a$ and 10$b$ are converted into substantially parallel light fluxes in the main scanning cross section, and are condensed in the sub-scanning cross section by the first and second incident optical elements 20$a$ and 20$b$.

Then, the first and second light fluxes LA and LB having passed through the first and second incident optical elements 20$a$ and 20$b$ pass through the first and second sub-scanning stops 30$a$ and 30$b$, and the first and second main scanning stops 40$a$ and 40$b$, and are then guided to a shared deflecting surface (first deflecting surface) 50$a$ of the deflecting unit 50.

Thereby, the light flux diameters in the main scanning direction and the sub-scanning direction of the first and second light fluxes LA and LB are limited, and the first and second light fluxes LA and LB are condensed in the sub-scanning direction so as to form a line image long in the main scanning direction in the vicinity of the deflecting surface 50$a$ of the deflecting unit 50.

Further, the third and fourth light fluxes LC and LD emitted from the third and fourth light sources 10$c$ and 10$d$ are converted into substantially parallel light fluxes in the main scanning cross section, and are condensed in the sub-scanning cross section by the third and fourth incident optical elements 20$c$ and 20$d$.

Then, the third and fourth light fluxes LC and LD having passed through the third and fourth incident optical elements 20$c$ and 20$d$ pass through the third and fourth sub-scanning stops 30$c$ and 30$d$, and the third and fourth main scanning stops 40$c$ and 40$d$, and are then guided to a shared deflecting surface (second deflecting surface) 50$b$ of the deflecting unit 50.

Thereby, the light flux diameters in the main scanning direction and the sub-scanning direction of the third and fourth light fluxes LC and LD are limited, and the third and fourth light fluxes LC and LD are condensed in the sub-scanning direction so as to form a line image long in the main scanning direction in the vicinity of the deflecting surface 50$b$ of the deflecting unit 50.

In the light scanning apparatus 1 according to the present embodiment, the first and second light fluxes LA and LB emitted from the first and second light sources 10$a$ and 10$b$ are obliquely incident on the deflecting surface 50$a$ of the deflecting unit 50 at different angles with respect to the main scanning cross section in the sub-scanning cross section.

Specifically, the first and second light fluxes LA and LB are obliquely incident on the deflecting surface 50$a$ of the deflecting unit 50 at angles of −0.05 radian and +0.05 radian with respect to the main scanning cross section, respectively.

Further, the third and fourth light fluxes LC and LD emitted from the third and fourth light sources 10$c$ and 10$d$ are obliquely incident on the deflecting surface 50$b$ of the deflecting unit 50 at different angles with respect to the main scanning cross section in the sub-scanning cross section.

Specifically, the third and fourth light fluxes LC and LD are obliquely incident on the deflecting surface 50$b$ of the deflecting unit 50 at angles of −0.05 radian and +0.05 radian with respect to the main scanning cross section, respectively.

Next, the first and second light fluxes LA and LB deflected by the deflecting surface 50$a$ of the deflecting unit 50 are condensed on the first and second scanned surfaces 100$a$ and 100$b$ by the first imaging optical element 60$a$, and the second imaging optical element 80$a$ and 80$b$.

Further, the third and fourth light fluxes LC and LD deflected by the deflecting surface 50$b$ of the deflecting unit 50 are condensed on the third and fourth scanned surfaces 100$c$ and 100$d$ by the first imaging optical element 60$b$, and the second imaging optical element 80$c$ and 80$d$.

Then, as the deflecting unit 50 rotates, the first to fourth scanned surfaces 100*a* to 100*d* can be optically scanned with the first to fourth light fluxes LA to LD at a constant speed in the main scanning direction to record an image on the first to fourth scanned surfaces 100*a* to 100*d*.

In the light scanning apparatus 1 according to the present embodiment, a first incident optical system 75*a* is formed by the first incident optical element 20*a*, the first sub-scanning stop 30*a* and the first main scanning stop 40*a*.

A second incident optical system 75*b* is formed by the second incident optical element 20*b*, the second sub-scanning stop 30*b* and the second main scanning stop 40*b*. A third incident optical system 75*c* is formed by the third incident optical element 20*c*, the third sub-scanning stop 30*c* and the third main scanning stop 40*c*.

A fourth incident optical system 75*d* is formed by the fourth incident optical element 20*d*, the fourth sub-scanning stop 30*d* and the fourth main scanning stop 40*d*.

Further, in the light scanning apparatus 1 according to the present embodiment, a first imaging optical system 85*a* is formed by the first imaging optical element 60*a* and the second imaging optical element 80*a*, and a second imaging optical system 85*b* is formed by the first imaging optical element 60*a* and the second imaging optical element 80*b*.

A third imaging optical system 85*c* is formed by the first imaging optical element 60*b* and the second imaging optical element 80*c*, and a fourth imaging optical system 85*d* is formed by the first imaging optical element 60*b* and the second imaging optical element 80*d*.

Figure 3B:
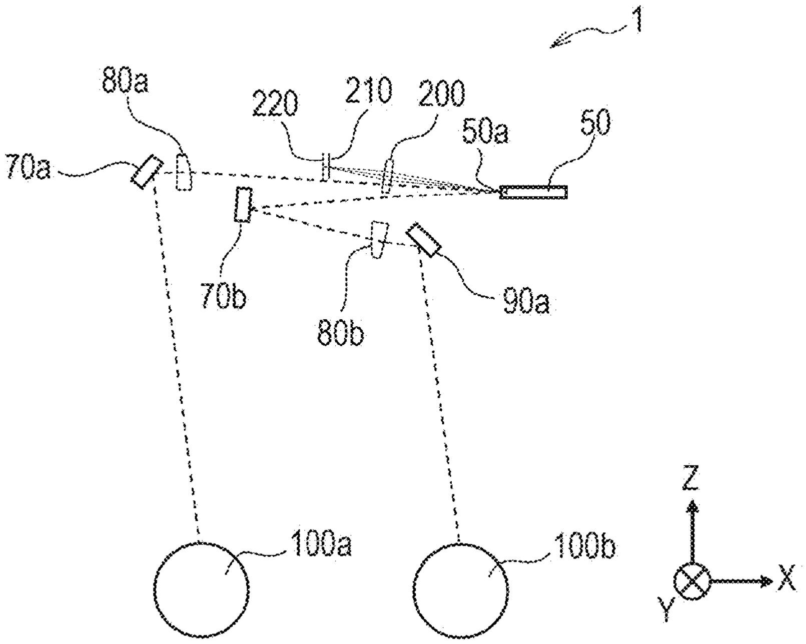
FIG. 3B is a partial sub-scanning cross sectional view of the light scanning apparatus according to the first embodiment.

FIGS. 3A and 3B show a partial developed view in the main scanning cross section and a partial sub-scanning cross sectional view of the light scanning apparatus 1 according to the present embodiment, respectively.

Specifically, FIG. 3A illustrates a synchronization detection optical system 95 in addition to the first and second incident optical systems 75*a* and 75*b*, and the first and second imaging optical systems 85*a* and 85*b* provided in the light scanning apparatus 1 according to the present embodiment.

Further, FIG. 3B illustrates the first and second imaging optical systems 85*a* and 85*b*, and the synchronization detection optical system 95.

Note that the first imaging optical element 60*a* is omitted, and the first and second light fluxes LA and LB are indicated by broken lines in order to clearly show the synchronization detection optical system 95, in FIG. 3B.

A direction (first direction) parallel to a straight line passing through a first intersecting point of the first scanned surface 100*a* and the optical axis of the first imaging optical system 85*a* and a second intersecting point of the second scanned surface 100*b* and the optical axis of the second imaging optical system 85*b* is considered.

At this time, as shown in FIG. 3B, the second scanned surface 100*b* is arranged between the deflecting unit 50 and the first scanned surface 100*a* in the direction.

In the light scanning apparatus 1 according to the present embodiment, in order to align scanning lines formed on the first to fourth scanned surfaces 100*a* to 100*d* with each other, writing start timings at which a light scanning is started on the first to fourth scanned surfaces 100*a* to 100*d* are synchronized with each other.

Then, in the light scanning apparatus 1 according to the present embodiment, the synchronization detection optical system 95 and the synchronization detection sensor 220 are provided to perform such synchronization.

Figure 5:
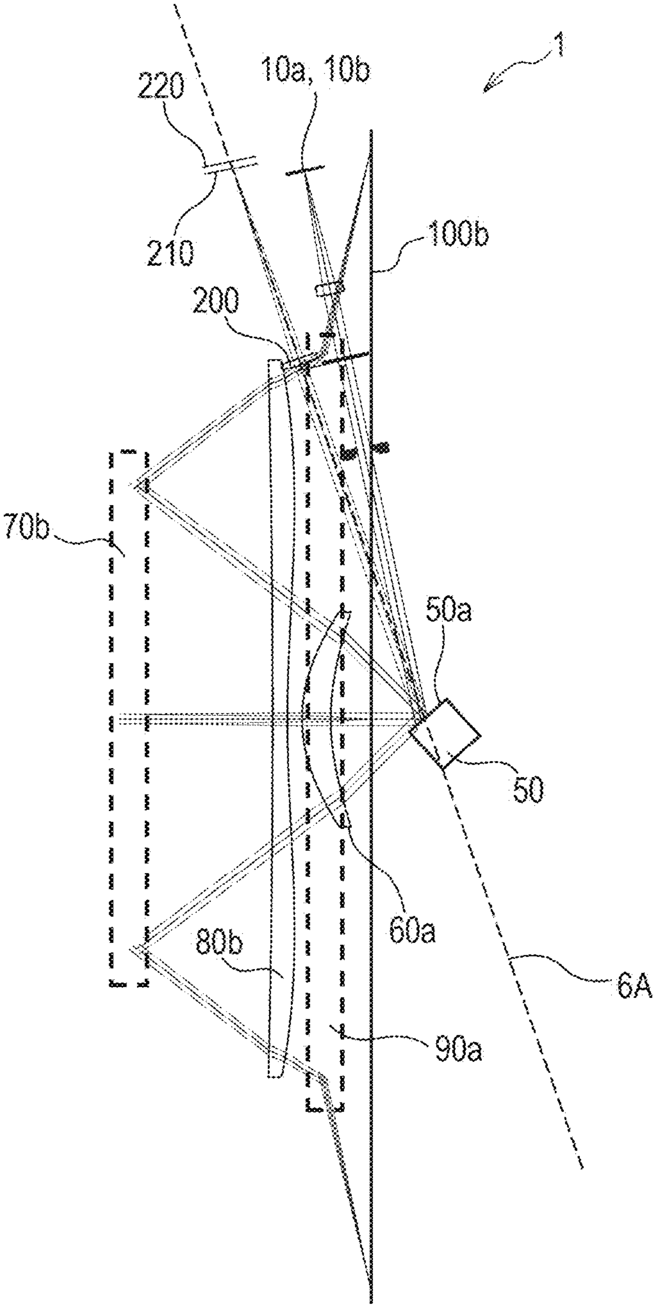
FIG. 5 is a partial projected view in the main scanning cross section of the light scanning apparatus according to the first embodiment.
Figure 6:
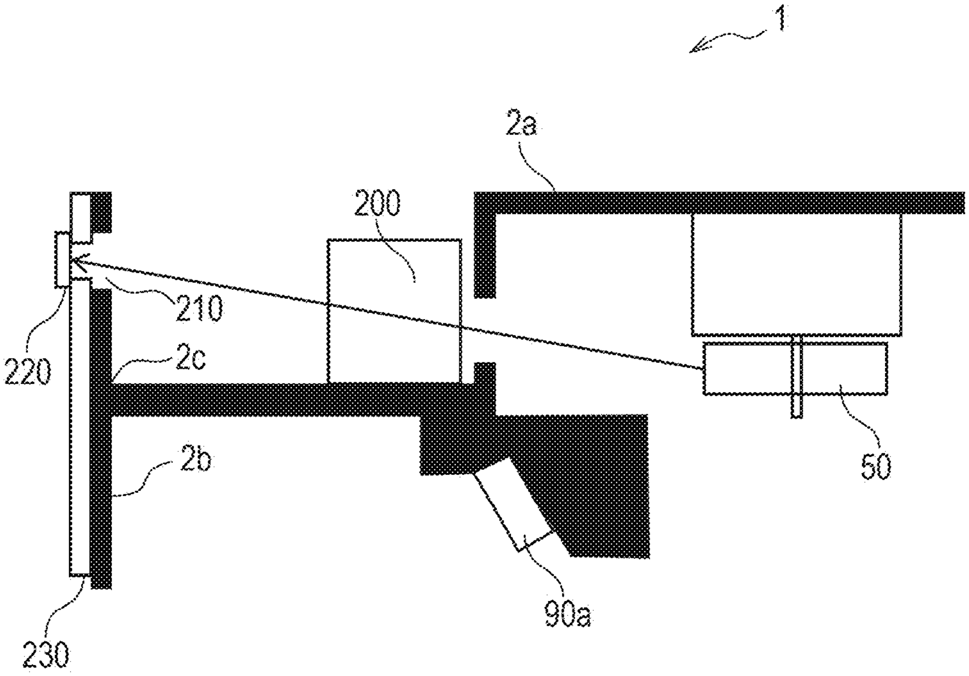
FIG. 6 is a partial enlarged sectional view of the light scanning apparatus according to the first embodiment.

Specifically, the first light flux LA deflected in a predetermined direction by the deflecting surface 50*a* of the deflecting unit 50 is guided to the synchronization detection sensor 220 provided on the substrate 230 while being condensed in the main scanning direction by the synchronization detection lens 200 (see also FIGS. 5 and 6).

In other words, the synchronization detection sensor 220 receives the first light flux LA deflected by the deflecting surface 50*a* of the deflecting unit 50 without the first imaging optical system 85*a*.

By condensing the first light flux LA in the main scanning direction in the vicinity of the synchronization detection slit 210 by the synchronization detection lens 200 as described above, a waveform formed on the synchronization detection sensor 220 can be made steep.

Accordingly, it is possible to improve an accuracy of synchronization in the light scanning apparatus 1 according to the present embodiment.

Then, a controller (not shown) determines a light emission timing of each of the first to fourth light sources 10*a* to 10*d* by using a synchronization signal (a beam detection (BD) signal) obtained based on a signal output from the synchronization detection sensor 220.

In the light scanning apparatus 1 according to the present embodiment, the synchronization detection optical system 95 is formed by the synchronization detection lens 200 and the synchronization detection slit 210.

Next, Tables 1, 2, 3-1, 3-2 and 3-3 below show specification values, a refractive index and coordinates of each optical element, and shapes of optical surfaces of each optical element in the light scanning apparatus 1 according to the present embodiment.

Note that only the first and second incident optical systems 75*a* and 75*b*, the first and second imaging optical systems 85*a* and 85*b*, and the synchronization detection optical system 95 are shown in Tables 2, 3-1, 3-2 and 3-3.

That is, the third and fourth incident optical systems 75*c* and 75*d* and the third and fourth imaging optical systems 85*c* and 85*d* are omitted in Tables 2, 3-1, 3-2 and 3-3.

TABLE 1

| Item | Parameter [Unit] | Value |
|---|---|---|
| Design wavelength of first to fourth light fluxes LA to LD from first to fourth light sources 10a to 10d | λ [nm] | 790 |
| Scanning width of first to fourth scanned surface 100a to 100d in main scanning direction | W [mm] | 326 |
| Distance between adjacent photosensitive drums | DP [mm] | 83 |
| Number of deflecting surfaces in deflecting unit 50 | [Surfaces] | 4 |
| Circumscribed diameter of deflecting unit 50 | Pd [mm] | 20 |
| Coordinates of rotation center of deflecting unit 50 | (X, Y) [mm] | (6.03, −3.79) |
| Angle in main scanning cross section between optical axes of first to fourth incident optical systems 75a to 75d and optical axes of first to fourth imaging optical systems 85a to 85d | θim [rad] | 1.36 |
| Absolute value of incident angle in sub-scanning cross section of first to fourth light fluxes LA to LD to deflecting surfaces 50a and 50b of deflecting unit 50 | θis [rad] | 0.05 |
| Angle in main scanning cross section between optical axis of synchronization detection optical system 95 and optical axes of first and second imaging optical systems 85a and 85b | θbd [rad] | 1.24 |
| Width in main scanning direction of opening portion of first to fourth main scanning stops 40a to 40d | Am [mm] | 3.75 |
| Width in sub-scanning direction of opening portion of first to fourth sub-scanning stops 30a to 30d | As [mm] | 2.70 |

TABLE 1-continued

| Item | Parameter [Unit] | Value |
|---|---|---|
| Focal length in main scanning cross section of synchronization detection lens 200 | Fbd [mm] | 62.09 |
| Distance on optical axis between deflection point on deflecting surface of deflecting unit 50 and synchronization detection sensor 220 | Dbd [mm] | 169.20 |
| Distance in X direction between rotation center of deflecting unit 50 and center of incident surface of synchronization detection lens 200 | Xm [mm] | 34.13 |
| Distance in X direction between rotation center of deflecting unit 50 and center of incident surface of second reflecting element 90a | Xbd [mm] | 40.77 |

TABLE 2

| | Refractive index | Coordinates of surface vertex | | | Direction cosine of optical axis | | |
|---|---|---|---|---|---|---|---|
| Optical surface | (λ = 790 nm) | tc(x) | tc(y) | tc(z) | gx(x) | gx(y) | gx(z) |
| Light emitting point of first light source 10a | — | −33.58 | 157.99 | −7.62 | −0.21 | 0.98 | −0.05 |
| Incident surface of first incident optical element 20a | 1.53 | −26.61 | 125.17 | −6.03 | −0.21 | 0.98 | −0.05 |
| Exit surface of first incident optical element 20a | — | −25.98 | 122.24 | −5.89 | −0.21 | 0.98 | −0.05 |
| First sub-scanning stop 30a | — | −22.01 | 103.53 | −4.99 | −0.21 | 0.98 | 0.00 |
| First main scanning stop 40a | — | −16.63 | 78.25 | −3.77 | −0.21 | 0.98 | 0.00 |
| Deflecting surface 50a of deflecting unit 50 (when scanning on-axis image height) | — | 0.53 | 0.66 | 0.00 | −0.78 | 0.63 | 0.00 |
| Incident surface of upper portion 60au of first imaging optical element | 1.53 | −26.00 | 0.00 | 0.00 | −1.00 | 0.00 | 0.00 |
| Exit surface of upper portion 60au of first imaging optical element | — | −34.20 | 0.00 | 0.00 | −1.00 | 0.00 | 0.00 |
| Incident surface of second imaging optical element 80a | 1.53 | −100.80 | 0.00 | 5.96 | −1.00 | 0.00 | 0.00 |
| Exit surface of second imaging optical element 80a | — | −105.10 | 0.00 | 5.96 | −1.00 | 0.00 | 0.00 |
| Reflecting surface of first reflecting element 70a | — | −113.67 | 5.00 | 5.58 | −0.76 | 0.00 | 0.65 |
| First scanned surface 100a | — | −97.70 | 0.00 | −112.69 | −0.15 | 0.00 | 0.99 |
| Light emitting point of second light source 10b | — | −33.58 | 157.99 | 7.62 | −0.21 | 0.98 | 0.05 |
| Incident surface of second incident optical element 20b | 1.53 | −26.61 | 125.17 | 6.03 | −0.21 | 0.98 | 0.05 |
| Exit surface of second incident optical element 20b | — | −25.98 | 122.24 | 5.89 | −0.21 | 0.98 | 0.05 |

TABLE 2-continued

| Optical surface | Refractive index (λ = 790 nm) | Coordinates of surface vertex tc(x) | tc(y) | tc(z) | Direction cosine of optical axis gx(x) | gx(y) | gx(z) |
|---|---|---|---|---|---|---|---|
| Second sub-scanning stop 30b | — | −22.01 | 103.53 | 4.99 | −0.21 | 0.98 | 0.00 |
| Second main scanning stop 40b | — | −16.63 | 78.25 | 3.77 | −0.21 | 0.98 | 0.00 |
| Deflecting surface 50a of deflecting unit 50 (when scanning on-axis image height) | — | 0.53 | 0.66 | 0.00 | −0.78 | 0.63 | 0.00 |
| Incident surface of lower portion 60al of first imaging optical element | 1.53 | −26.00 | 0.00 | 0.00 | −1.00 | 0.00 | 0.00 |
| Exit surface of lower portion 60al of first imaging optical element | — | −34.20 | 0.00 | 0.00 | −1.00 | 0.00 | 0.00 |
| Incident surface of second imaging optical element 80b | 1.53 | −42.87 | 0.00 | −15.46 | −0.99 | 0.00 | 0.16 |
| Exit surface of second imaging optical element 80b | — | −38.63 | 0.00 | −16.15 | −0.99 | 0.00 | 0.16 |
| Reflecting surface of first reflecting element 70b | — | −81.82 | 0.00 | −4.68 | −1.00 | 0.00 | 0.08 |
| Reflecting surface of second reflecting element 90a | — | −28.10 | −4.50 | −17.47 | −0.70 | 0.00 | −0.71 |
| Second scanned surface 100b | — | −14.70 | 0.00 | −112.69 | 0.17 | 0.00 | −0.99 |
| Incident surface of synchronization detection lens 200 | 1.49 | −34.74 | 101.58 | 4.89 | −0.33 | 0.94 | 0.05 |
| Exit surface of synchronization detection lens 200 | — | −35.39 | 103.46 | 4.99 | −0.33 | 0.94 | 0.05 |
| Synchronization detection slit 210 | — | −54.46 | 158.84 | 7.75 | −0.21 | 0.98 | 0.00 |
| Synchronization detection sensor 220 | — | −55.11 | 160.72 | 7.84 | −0.21 | 0.98 | 0.00 |

TABLE 3-1

| | Aspherical surface coefficient | | | | | | |
|---|---|---|---|---|---|---|---|
| | | First incident optical element 20a | | Upper portion 60au of first imaging optical element | | Second imaging optical element 80a | |
| | Coefficient | Incident surface | Exit surface | Incident surface | Exit surface | Incident surface | Exit surface |
| Meridional line | R | — | −3.72E+01 | −7.20E+01 | −4.32E+01 | 4.00E+03 | 3.46E+02 |
| | K | — | — | 8.92E−01 | −5.73E−01 | — | −9.02E+01 |
| | B3 | — | — | — | — | — | — |

TABLE 3-1-continued

| | | Aspherical surface coefficient | | | | | |
|---|---|---|---|---|---|---|---|
| | | First incident optical element 20a | | Upper portion 60au of first imaging optical element | | Second imaging optical element 80a | |
| | Coefficient | Incident surface | Exit surface | Incident surface | Exit surface | Incident surface | Exit surface |
| | B4 | — | — | −7.61E−07 | −1.99E−07 | — | −2.17E−07 |
| | B5 | — | — | — | — | — | — |
| | B6 | — | — | 6.79E−09 | 1.64E−09 | — | 1.80E−11 |
| | B7 | — | — | — | — | — | — |
| | B8 | — | — | −5.89E−12 | 1.27E−12 | — | −1.07E−15 |
| | B9 | — | — | — | — | — | — |
| | B10 | — | — | 1.62E−15 | −1.42E−15 | — | 2.98E−20 |
| Sagittal line | r | — | −2.62E+01 | 2.00E+01 | 2.06E+01 | 2.69E+01 | 2.94E+02 |
| | E1 | — | — | — | — | — | 1.97E−07 |
| | E2 | — | — | — | 1.56E−05 | −5.14E−06 | −2.37E−06 |
| | E3 | — | — | — | — | — | −3.44E−09 |
| | E4 | — | — | — | −3.39E−08 | — | −2.47E−10 |
| | E5 | — | — | — | — | — | 1.50E−12 |
| | E6 | — | — | — | 3.96E−11 | — | 1.69E−14 |
| | E7 | — | — | — | — | — | −2.50E−16 |
| | E8 | — | — | — | −6.56E−14 | — | −1.80E−18 |
| | E9 | — | — | — | — | — | 1.41E−20 |
| | E10 | — | — | — | 5.40E−17 | — | 7.12E−23 |
| Additional term | M0_1 | — | — | — | −3.93E−02 | −1.51E−01 | 1.07E−02 |
| | M1_1 | — | — | — | — | −5.64E−06 | 2.98E−06 |
| | M2_1 | — | — | — | 3.68E−05 | −2.60E−05 | −4.00E−05 |
| | M3_1 | — | — | — | — | 1.31E−07 | 1.17E−07 |
| | M4_1 | — | — | — | — | 5.69E−09 | 7.91E−09 |
| | M5_1 | — | — | — | — | −3.83E−11 | −3.15E−11 |
| | M6_1 | — | — | — | — | 8.34E−14 | −6.67E−13 |
| | M7_1 | — | — | — | — | 5.13E−15 | 3.85E−15 |
| | M8_1 | — | — | — | — | −2.89E−17 | 8.31E−17 |
| | M9_1 | — | — | — | — | −2.20E−19 | −1.37E−19 |
| | M10_1 | — | — | — | — | −5.52E−22 | −5.82E−21 |
| | C3 | −8.67E−03 | — | — | — | — | — |
| | C5 | −7.85E−03 | — | — | — | — | — |

TABLE 3-2

| | | Aspherical surface coefficient | | | | | |
|---|---|---|---|---|---|---|---|
| | | Second incident optical element 20b | | Lower portion 60al of first imaging optical element | | Second imaging optical element 80b | |
| | Coefficient | Incident surface | Exit surface | Incident surface | Exit surface | Incident surface | Exit surface |
| Meridional line | R | — | −3.72E+01 | −7.20E+01 | −4.43E+01 | 4.00E+03 | −3.84E+02 |
| | K | — | — | 8.92E−01 | −1.16E+00 | — | −7.63E+01 |
| | B3 | — | — | — | — | — | — |
| | B4 | — | — | −7.61E−07 | −1.52E−06 | — | 1.34E−07 |
| | B5 | — | — | — | — | — | — |
| | B6 | — | — | 6.79E−09 | 1.75E−09 | — | −7.45E−12 |
| | B7 | — | — | — | — | — | — |
| | B8 | — | — | −5.89E−12 | 9.64E−13 | — | 3.30E−16 |
| | B9 | — | — | — | — | — | — |
| | B10 | — | — | 1.62E−15 | −1.20E−15 | — | −7.02E−21 |
| Sagittal line | r | — | −2.62E+01 | 2.00E+01 | 5.46E+01 | −4.62E+01 | 1.10E+02 |
| | E1 | — | — | — | — | — | 7.53E−07 |
| | E2 | — | — | — | 3.97E−06 | −5.27E−09 | −1.79E−06 |
| | E3 | — | — | — | — | — | 7.48E−10 |
| | E4 | — | — | — | 9.86E−08 | — | 2.81E−10 |
| | E5 | — | — | — | — | — | −1.82E−13 |
| | E6 | — | — | — | −2.89E−10 | — | −4.07E−14 |
| | E7 | — | — | — | — | — | 1.74E−17 |
| | E8 | — | — | — | 3.62E−13 | — | 3.25E−18 |
| | E9 | — | — | — | — | — | −5.09E−22 |
| | E10 | — | — | — | −1.62E−16 | — | −9.98E−23 |
| Additional term | M0_1 | — | — | — | 1.14E−01 | −1.50E−01 | 7.95E−02 |
| | M1_1 | — | — | — | — | −2.04E−05 | −1.32E−05 |
| | M2_1 | — | — | — | −5.07E−05 | −3.51E−08 | −1.55E−05 |

TABLE 3-2-continued

| | Aspherical surface coefficient | | | | | |
|---|---|---|---|---|---|---|
| | Second incident optical element 20b | | Lower portion 60al of first imaging optical element | | Second imaging optical element 80b | |
| Coefficient | Incident surface | Exit surface | Incident surface | Exit surface | Incident surface | Exit surface |
| M3_1 | — | — | — | — | 4.84E−08 | 4.46E−08 |
| M4_1 | — | — | — | — | −5.23E−10 | 1.81E−09 |
| M5_1 | — | — | — | — | −1.02E−11 | −8.81E−12 |
| M6_1 | — | — | — | — | 2.07E−13 | −1.66E−13 |
| M7_1 | — | — | — | — | 9.45E−16 | 7.76E−16 |
| M8_1 | — | — | — | — | −2.87E−18 | 2.43E−17 |
| M9_1 | — | — | — | — | −2.86E−20 | −2.11E−20 |
| M10_1 | — | — | — | — | 7.60E−23 | −4.80E−22 |
| C3 | −8.67E−03 | — | — | — | — | — |
| C5 | −7.85E−03 | — | — | — | — | — |

TABLE 3-3

| | Aspherical surface coefficient | |
|---|---|---|
| | Synchronization detection lens 200 | |
| Coefficient | Incident surface | Exit surface |
| Curvature radius of meridional line R | 3.01E+01 | — |
| Curvature radius of sagittal line r | 3.01E+01 | −4.59E+01 |

Further, incident surfaces of the first to fourth incident optical elements 20_a_ to 20_d_ provided in the light scanning apparatus 1 according to the present embodiment are diffracting surfaces on which diffracting gratings are formed, and are formed by injection-molding with using a plastic material as described above.

For this reason, a so-called temperature compensation optical system is adopted in which changes in the refractive powers of the first to fourth incident optical elements 20_a_ to 20_d_ due to environmental variations are compensated for by changes in the diffractive powers of the diffracting surfaces associated with changes in the wavelengths of the first to fourth light fluxes LA to LD in the first to fourth light sources 10_a_ to 10_d_.

Specifically, the diffracting surface formed on the incident surface of each of the first to fourth incident optical elements 20_a_ to 20_d_ is defined by a phase function expressed by the following Expression (1):

$$\phi = \frac{2\pi M}{\lambda}\left(C_3 Z^2 \times C_5 Y^2\right). \tag{1}$$

In Expression (1), q is a phase function, M is a diffraction order, λ is a design wavelength. Since first order diffraction light is used in the light scanning apparatus 1 according to the present embodiment, M is 1, and λ is 790 nm.

Further, a shape (a meridional shape) in the main scanning cross section of each of incident surfaces and exit surfaces of the first imaging optical elements 60_a_ and 60_b_, and the second imaging optical elements 80_a_ to 80_d_ provided in the light scanning apparatus 1 according to the present embodiment has an aspheric shape represented by a tenth order polynomial function.

Specifically, an intersecting point (a surface vertex) of the optical surface and the optical axis of each of the first imaging optical elements 60_a_ and 60_b_, and the second imaging optical elements 80_a_ to 80_d_ is set as the origin.

Further, the optical axis of each optical surface is defined as an X-axis, an axis perpendicular to the optical axis in the main scanning cross section is defined as a Y-axis, and an axis perpendicular to the optical axis in the sub-scanning cross section is defined as a Z-axis.

At this time, the aspheric shape in the main scanning cross section of each of the incident surfaces and the exit surfaces of the first imaging optical elements 60_a_ and 60_b_, and the second imaging optical elements 80_a_ to 80_d_ is expressed by the following Expression (2):

$$X = \frac{\frac{Y^2}{R}}{1 + \sqrt{1 - (1+K)\left(\frac{Y}{R}\right)^2}} + \sum_{i=1}^{10} B_i Y^i. \tag{2}$$

In Expression (2), R is a curvature radius (a curvature radius of meridional line) in the main scanning cross section, K is an eccentricity, and Bi is an aspheric coefficient.

Further, the shape (a sagittal shape) in the sub-scanning cross section of each of the incident surfaces and the exit surfaces of the first imaging optical elements 60_a_ and 60_b_, and the second imaging optical elements 80_a_ to 80_d_ is represented by the following Expression (3):

$$S = \frac{\frac{Z^2}{r'}}{1 + \sqrt{1 - \left(\frac{Z}{r'}\right)^2}} + \sum_{i=0}^{16}\sum_{j=1}^{8} M_{ij} Y^i Z^j. \tag{3}$$

In Expression (3), S is a shape (a sagittal shape) in a cross section which includes a normal line of a meridional line at a predetermined position in the main scanning direction and is perpendicular to the main scanning cross section, and $M_{ij}$ is an aspheric coefficient.

Furthermore, a curvature radius (a curvature radius of sagittal line) r' in the sub-scanning cross section at a position away from the optical axis by Y in the main scanning direction is represented by the following Expression (4):

$$\frac{1}{r'} = \frac{1}{r} + \sum_{i=1}^{10} E_i Y^i. \tag{4}$$

In Expression (4), r is the curvature radius of sagittal line on the optical axis, and $E_i$ is a sagittal change coefficient.

Although the shapes of the optical surfaces of the first imaging optical elements 60*a* and 60*b*, and the second imaging optical elements 80*a* to 80*d* provided in the light scanning apparatus 1 according to the present embodiment are defined by the functions represented by Expressions (1) to (4) described above, the present invention is not limited thereto, and the shapes may be defined by other functions.

As described above, in the light scanning apparatus 1 according to the present embodiment, the first and second light fluxes LA and LB pass through the shared first imaging optical element 60*a*, and the third and fourth light fluxes LC and LD pass through the shared first imaging optical element 60*b*.

Specifically, as shown in FIGS. 2A to 2C, the first and second light fluxes LA and LB pass through an upper portion 60*au* and a lower portion 60*al* in the sub-scanning direction of the first imaging optical element 60*a*, respectively.

Further, the third and fourth light fluxes LC and LD pass through an upper portion and a lower portion in the sub-scanning direction of the first imaging optical element 60*b*, respectively.

Note that the upper portion and the lower portion in the sub-scanning direction may be referred to a portion on a side opposite to the scanned surface in the sub-scanning direction, namely on an opposite scanned surface side, and a portion on a scanned surface side, respectively.

As shown in Tables 3-1 and 3-2, the shape of the exit surface of the first imaging optical element 60*a* is defined to be different between the upper portion 60*au* through which the first light flux LA passes and the lower portion 60*al* through which the second light flux LB passes.

That is, the first imaging optical element 60*a* is a single optical element, whereas is formed as a multistage configuration in which the shape of the exit surface is different between the upper portion 60*au* and the lower portion 60*al* in the sub-scanning direction, and the first imaging optical element 60*b* also has the same configuration.

Figure 4:
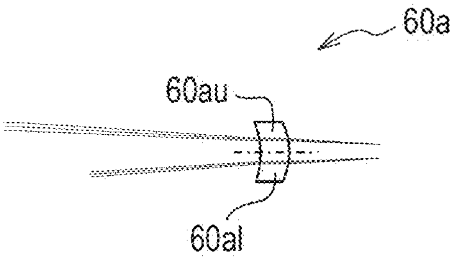
FIG. 4 is a sub-scanning cross sectional view of a first imaging optical element provided in the light scanning apparatus according to the first embodiment.

FIG. 4 shows a sub-scanning cross sectional view of the first imaging optical element 60*a* provided in the light scanning apparatus 1 according to the present embodiment.

As shown in FIG. 4, the first imaging optical element 60*a* has the upper portion 60*au* through which the first light flux LA passes and the lower portion 60*al* through which the second light flux LB passes, with a center line indicated by a broken line in the sub-scanning direction interposed therebetween.

Then, the upper portion 60*au* and the lower portion 60*al* of the first imaging optical element 60*a* have exit surfaces formed in the shapes shown in Table 3-1 and Table 3-2, respectively.

Thereby, both of the first and second light fluxes LA and LB emitted from the first and second light sources 10*a* and 10*b* can be efficiently condensed by the first imaging optical element 60*a*.

Next, folding of the optical paths of the first to fourth light fluxes LA to LD by the first reflecting elements 70*a* to 70*d*, and the second reflecting elements 90*a* and 90*b* in the light scanning apparatus 1 according to the present embodiment is described.

The optical paths of the second and third light fluxes LB and LC guided to the second and third scanned surfaces 100*b* and 100*c* arranged inside the first and fourth scanned surfaces 100*a* and 100*d* in the optical axis direction are folded by the two reflecting elements as shown in FIG. 2C.

Thereby, the optical paths and the optical path lengths of the first and fourth light fluxes LA and LD guided to the first and fourth scanned surfaces 100*a* and 100*d* can be matched with the optical paths and the optical path lengths of the second and third light fluxes LB and LC guided to the second and third scanned surfaces 100*b* and 100*c*.

Accordingly, it is possible to reduce a size in the sub-scanning direction of the housing 2 by using a minimum number of reflecting elements in the light scanning apparatus 1 according to the present embodiment.

Next, an arrangement of the synchronization detection optical system 95 in the light scanning apparatus 1 according to the present embodiment is described.

As described above, the synchronization between the first to fourth light sources 10*a* to 10*d* is performed by causing the synchronization detection sensor 220 to receive a part of the first light flux LA emitted from the first light source 10*a* in the light scanning apparatus 1 according to the present embodiment.

Here, the first light source 10*a* corresponds to the first scanned surface 100*a* which is arranged relatively outside in the X direction between the first and second scanned surfaces 100*a* and 100*b*.

That is, the light scanning apparatus 1 according to the present embodiment adopts a configuration in which the synchronization detection is performed by using a light flux emitted from a light source different from a light source corresponding to a scanned surface which is arranged relatively inside in the optical axis direction among a plurality of scanned surfaces.

In other words, the optical paths of the second and third light fluxes LB and LC on the inner side in the optical axis direction where a plurality of folds occur as described above and the optical path of the first light flux LA on the outer side in the optical axis direction where synchronization detection is performed are separately provided in the light scanning apparatus 1 according to the present embodiment.

Thereby, as shown in FIG. 3B, the second reflecting element 90*a* for folding the optical path of the second light flux LB on the inner side in the optical axis direction is arranged on the lower side in the sub-scanning direction with respect to the deflecting unit 50.

On the other hand, the synchronization detection lens 200 provided in the synchronization detection optical path in which a part of the first light flux LA deflected by the deflecting unit 50 travels is arranged above the deflecting unit 50 in the sub-scanning direction.

Therefore, the second reflecting element 90*a* and the synchronization detection lens 200 can be arranged to be away from each other in the sub-scanning direction.

Next, distances between the first to fourth scanned surfaces 100*a* to 100*d* in the light scanning apparatus 1 according to the present embodiment are described.

As shown in FIG. 2C, a distance DP between adjacent ones of the first to fourth photosensitive drums 100*a* to 100*d* forming the first to fourth scanned surfaces 100*a* to 100*d*, respectively, is a parameter directly linked to the size in the optical axis direction of the housing 2.

That is, as the distance DP between adjacent photosensitive drums becomes shorter, miniaturization in the optical axis direction of the housing 2 progresses, which is advantageous in a product such as an image forming apparatus in which the light scanning apparatus 1 according to the present embodiment is mounted.

Specifically, a distance between a first intersecting point of the first scanned surface 100*a* and the optical axis of the first imaging optical system 85*a* and a second intersecting point of the second scanned surface 100*b* and the optical axis of the second imaging optical system 85*b* is defined as DP.

Then, when scanning widths on the first and second scanned surfaces 100*a* and 100*b* are defined as W, it is preferred that the following inequality (5) is satisfied in the light scanning apparatus 1 according to the present embodiment:

$$0.25 \leq DP/W \leq 0.30. \quad (5)$$

In the light scanning apparatus 1 according to the present embodiment, and the distance DP between adjacent photosensitive drums is set to 83 mm (DP/W=0.25) with setting the scanning width W in the main scanning direction to 326 mm so as to be compatible with an A3 size printing sheet, thereby achieving a reduction in the size of the housing 2.

On the other hand, it is necessary to pay attention to the arrangement of each optical element by shortening the distance DP between adjacent photosensitive drums in the light scanning apparatus 1 according to the present embodiment.

Specifically, it is necessary to arrange each optical element accommodated in the housing 2 at the center of the housing 2, namely close to the deflecting unit 50 in order to reduce the size in the optical axis direction of the housing 2.

FIG. 5 shows a partial projected view in the main scanning cross section of the light scanning apparatus 1 according to the present embodiment.

Specifically, FIG. 5 shows the optical path of the first light flux LA between the first light source 10*a* and the synchronization detection sensor 220, and the optical path of the second light flux LB between the second light source 10*b* and the second scanned surface 100*b*.

As shown in FIG. 5, when the distance DP between adjacent photosensitive drums is reduced in the light scanning apparatus 1 according to the present embodiment, the synchronization detection lens 200 and one end portion in the longitudinal direction of the second reflecting element 90*a* are arranged so as to be close to each other or partially overlap each other in the main scanning cross section.

Note that each of the reflecting elements provided in the light scanning apparatus 1 according to the present embodiment is supported by bringing both end portions in the longitudinal direction into contact with support portions (not shown) formed in the housing 2.

That is, the synchronization detection lens 200 and the support portion which supports one end portion in the longitudinal direction of the second reflecting element 90*a* are close to each other or partially overlap with each other in the main scanning cross section in the light scanning apparatus 1 according to the present embodiment.

In the light scanning apparatus 1 according to the present embodiment, the housing 2 has a box portion formed in a U-shape in the sub-scanning cross section, as shown in FIG. 2C.

Then, each optical element is inserted into the internal space of the box portion from the opened lower side in the sub-scanning direction of the housing 2, each optical element is supported by each support portion formed in the housing 2, and then the internal space is covered with a lid portion (not shown).

When the optical elements are inserted from the lower side in the sub-scanning direction which is open in the housing 2 as described above, it is very difficult to support the optical elements by the support portions at a plurality of positions which are the same in the main scanning cross section but are different from each other in the sub-scanning direction.

That is, when the distance DP between adjacent photosensitive drums is reduced in the light scanning apparatus 1 according to the present embodiment, it is difficult to arrange the synchronization detection lens 200 and the second reflecting element 90*a* on the same side with respect to a bottom surface 2*a* (a first surface) of the housing 2.

In other words, it is difficult to arrange both the synchronization detection lens 200 and the second reflecting element 90*a* on an inner side of the bottom surface 2*a* of the housing 2 in the light scanning apparatus 1 according to the present embodiment.

Accordingly, the light scanning apparatus 1 according to the present embodiment adopts a configuration in which the synchronization detection lens 200 is arranged in a region opposite to a region where the deflecting unit 50 and the second reflecting element 90*a* are arranged with respect to the bottom surface 2*a* of the housing 2.

In other words, the synchronization detection lens 200 and the deflecting unit 50 are arranged on one side and the other side of the bottom surface 2*a* of the housing 2, respectively, in the light scanning apparatus 1 according to the present embodiment.

In still other words, the synchronization detection lens 200 and the deflecting unit 50 are arranged on an outer side and an inner side of the bottom surface 2*a* of the housing 2, respectively, in the light scanning apparatus 1 according to the present embodiment.

FIG. 6 shows a partially enlarged view of the light scanning apparatus 1 according to the present embodiment in a 6A cross section perpendicular to the main scanning cross section shown in FIG. 5, and specifically, shows an enlarged view of it in the vicinity of the synchronization detection lens 200 in the 6A cross section.

As shown in FIG. 6, the synchronization detection lens 200 is arranged on a side opposite to the deflecting unit 50 with respect to the bottom surface 2*a* of the housing 2, namely on the outer side of the bottom surface 2*a* of the housing 2 in the light scanning apparatus 1 according to the present embodiment.

More specifically, the synchronization detection lens 200 is arranged in a concave portion formed on the bottom surface 2*a* of the housing 2 in the light scanning apparatus 1 according to the present embodiment.

That is, the bottom surface 2*a* of the housing 2 holds an upper surface of the synchronization detection lens 200.

In other words, the bottom surface 2*a* of the housing 2 provided in the light scanning apparatus 1 according to the present embodiment has a concave shape around the region where the synchronization detection lens 200 is arranged.

In still other words, the shape of the bottom surface 2*a* of the housing 2 provided in the light scanning apparatus 1 according to the present embodiment is not planer.

On the other hand, the second reflecting element 90*a* is arranged on the same side as the deflecting unit 50 with respect to the bottom surface 2*a* of the housing 2, namely on the inner side of the bottom surface 2*a* of the housing 2, in other words, in the internal space of the box portion of the housing 2.

Thereby, the synchronization detection lens 200 and the second reflecting element 90*a* can be arranged without physical interference by inserting them from opposite sides in the sub-scanning direction and bringing them into contact with the support portions, even if the support portion of the synchronization detection lens 200 and the support portion of the second reflecting element 90*a* overlap each other in the main scanning cross section.

Further, it is possible to reduce the influence of a temperature rise or dust caused by the rotation of the deflecting unit 50 on the synchronization detection lens 200 by separating the region where the synchronization detection lens 200 is arranged and the region where the deflecting unit 50 is separated from each other with the bottom surface 2*a* of the housing 2 interposed therebetween.

Therefore, it is possible to suppress a decrease in synchronization detection performance in the light scanning apparatus 1 according to the present embodiment.

In the light scanning apparatus 1 according to the present embodiment, it is possible to achieve both the shortening of the distance DP between adjacent photosensitive drums and the mounting of the synchronization detection optical system 95 by adopting the above-described configuration to devise a method of mounting the synchronization detection lens 200.

Further, in the light scanning apparatus 1 according to the present embodiment, the synchronization detection sensor 220 is arranged on an outer side of a side surface 2*b* (a second surface) of the housing 2, and the synchronization detection slit 210 is formed integrally with the side surface 2*b* of the housing 2, namely in the side surface 2*b* of the housing 2, as shown in FIG. 6.

Note that the bottom surface 2*a* and the side surface 2*b* are integrally coupled with each other at a portion 2*c* in the housing 2, as shown in FIG. 6.

As shown in FIG. 6, the first light flux LA deflected in a predetermined direction by the deflecting unit 50 exits to the outer side of the bottom surface 2*a* of the housing 2 by passing through an opening portion formed in a predetermined wall surface of the concave portion of the bottom surface 2*a* of the housing 2, and then is incident on the synchronization detection lens 200.

Then, the first light flux LA that has passed through the synchronization detection lens 200 is incident on the synchronization detection sensor 220 by passing through the synchronization detection slit 210.

Next, the shape of each of the second imaging optical elements 80*a* to 80*d* provided in the light scanning apparatus 1 according to the present embodiment is described.

As described above, the second imaging optical element 80*a* for guiding the first light flux LA to the first scanned surface 100*a* and the second imaging optical element 80*b* for guiding the second light flux LB to the second scanned surface 100*b* have shapes different from each other, and are arranged at positions optically asymmetric to each other.

That is, the second imaging optical elements 80*a* to 80*d* are formed in different shapes from each other in the light scanning apparatus 1 according to the present embodiment.

Thereby, the first to fourth light fluxes LA to LD guided by the first to fourth imaging optical systems 85*a* to 85*d* different from each other can be suitably condensed on the first to fourth scanned surfaces 100*a* to 100*d*.

However, the present invention is not limited to this, and it is possible to obtain the effect of the present embodiment, even if the second imaging optical elements 80*a* and 80*b* are formed in the same shape as each other and are arranged at positions optically symmetrical to each other, for example.

Figure 7A:
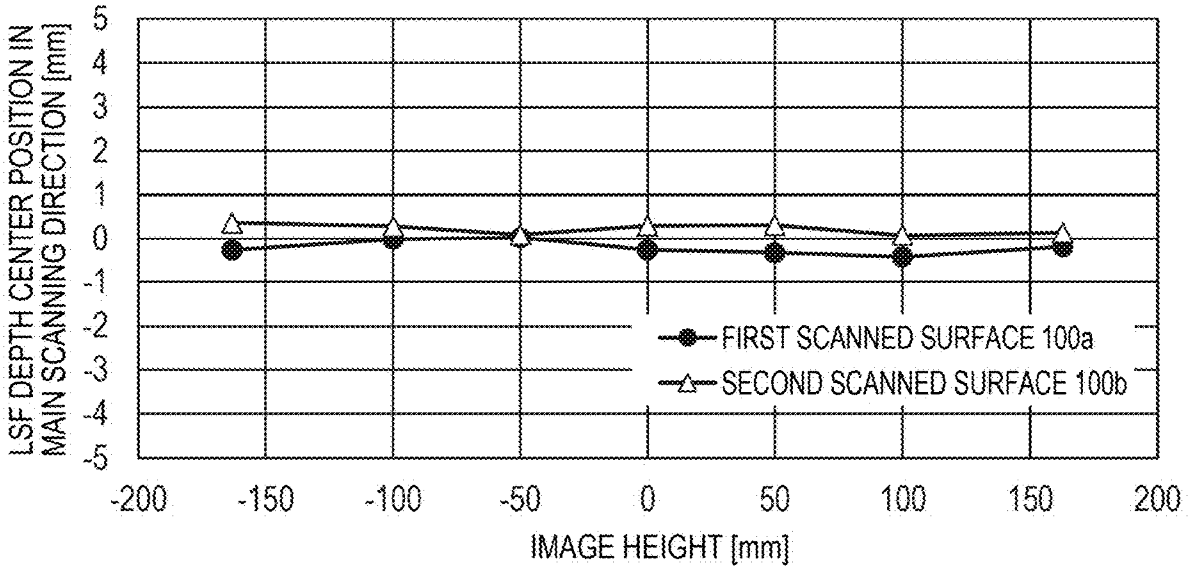
FIG. 7A is a graph showing an image height dependence of a LSF depth center position in a main scanning direction on each scanned surface in the light scanning apparatus according to the first embodiment.
Figure 7B:
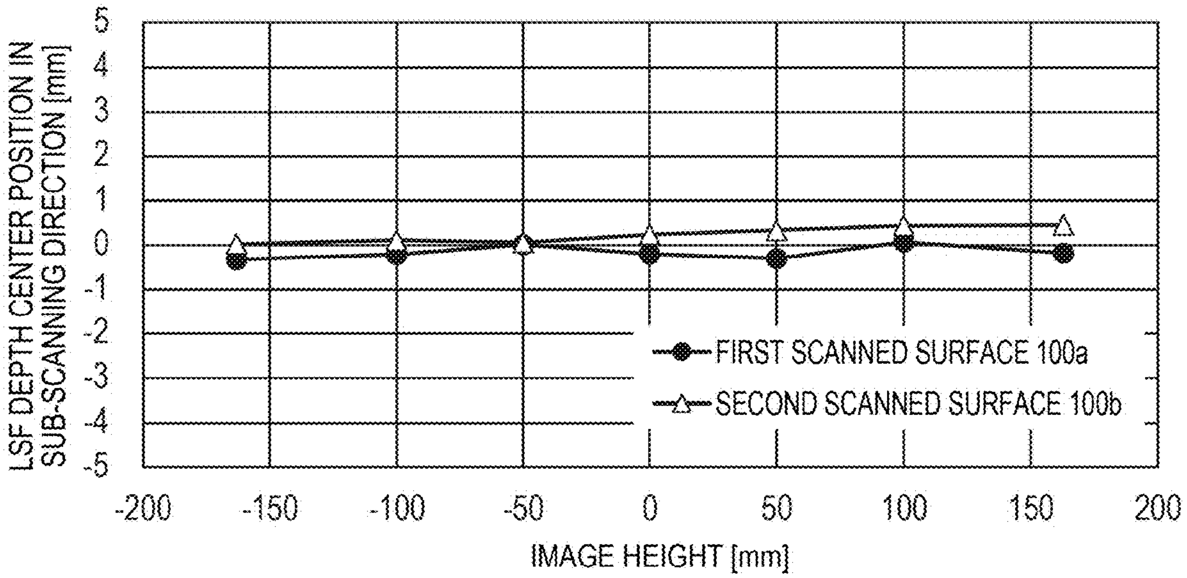
FIG. 7B is a graph showing an image height dependence of a LSF depth center position in a sub-scanning direction on each scanned surface in the light scanning apparatus according to the first embodiment.

FIGS. 7A and 7B show image height dependencies of a LSF (Line Spread Function) depth center position in the main scanning direction and a LSF depth center position in the sub-scanning direction on each scanned surface in the light scanning apparatus 1 according to the present embodiment, respectively.

Note that the LSF depth center position in the main scanning direction and the LSF depth center position in the sub-scanning direction refer to center positions of regions in which the LSF widths in the main scanning direction and the sub-scanning direction are equal to or less than a slice level when defocusing is performed in the optical axis direction in the vicinity of a predetermined scanned surface, respectively.

In the light scanning apparatus 1 according to the present embodiment, the slice level is set to 120 μm over the entire image height in both the main scanning direction and the sub-scanning direction.

In addition, the LSF width in the main scanning direction and the LSF width in the sub-scanning direction indicate widths when light amount profiles obtained by integrating a spot profile in the sub-scanning direction and the main scanning direction at each image height are sliced at a position of 13.5% of the maximum value, respectively.

As shown in FIGS. 7A and 7B, both of the LSF depth center position in the main scanning direction and the LSF depth center position in the sub-scanning direction are within the range of +1 mm over the entire image height, so that it can be seen that the light scanning apparatus 1 according to the present embodiment achieves a favorable imaging performance.

Figure 8A:
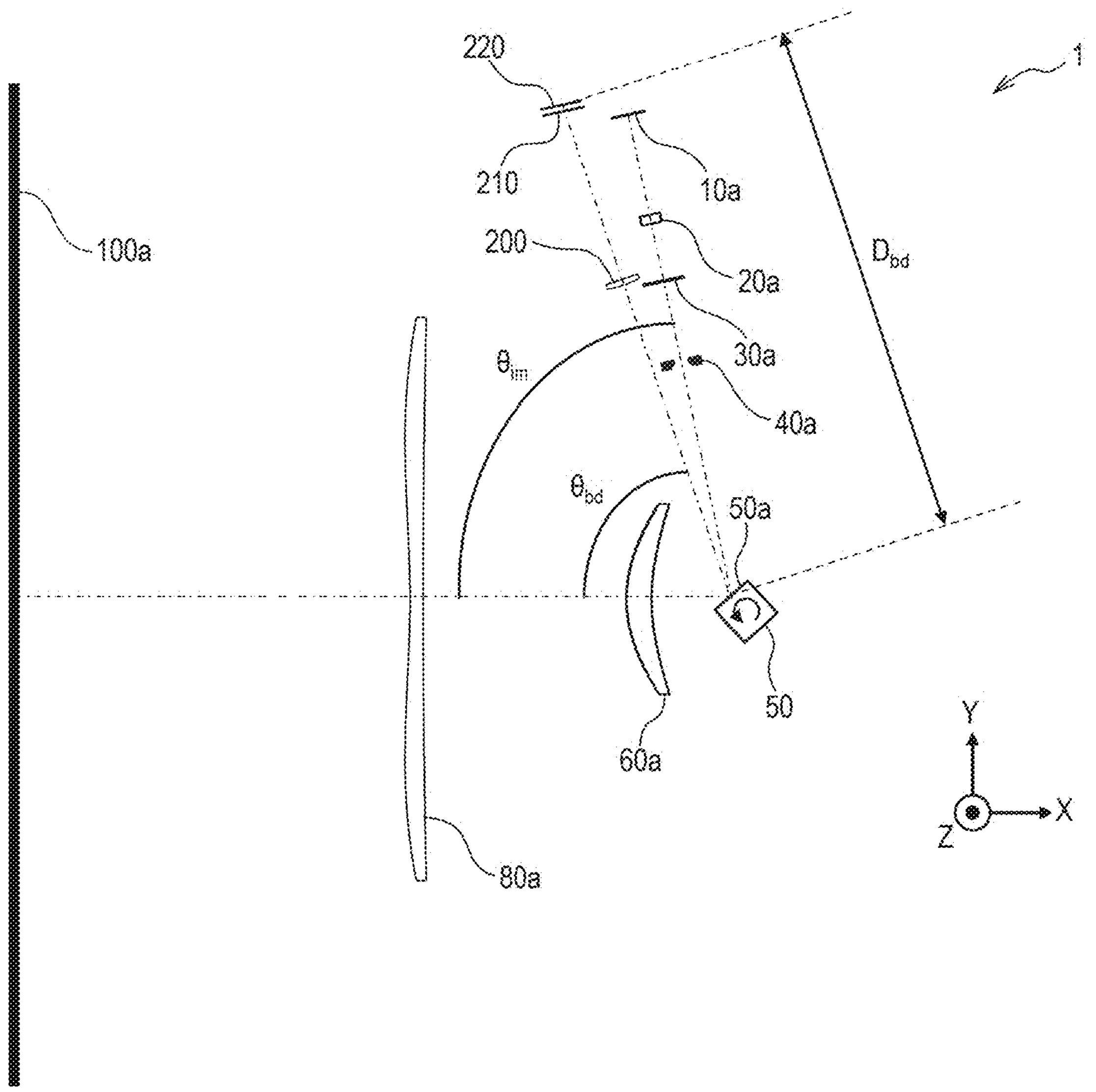
FIG. 8A is a partial developed view in the main scanning cross section of the light scanning apparatus according to the first embodiment.
Figure 8B:
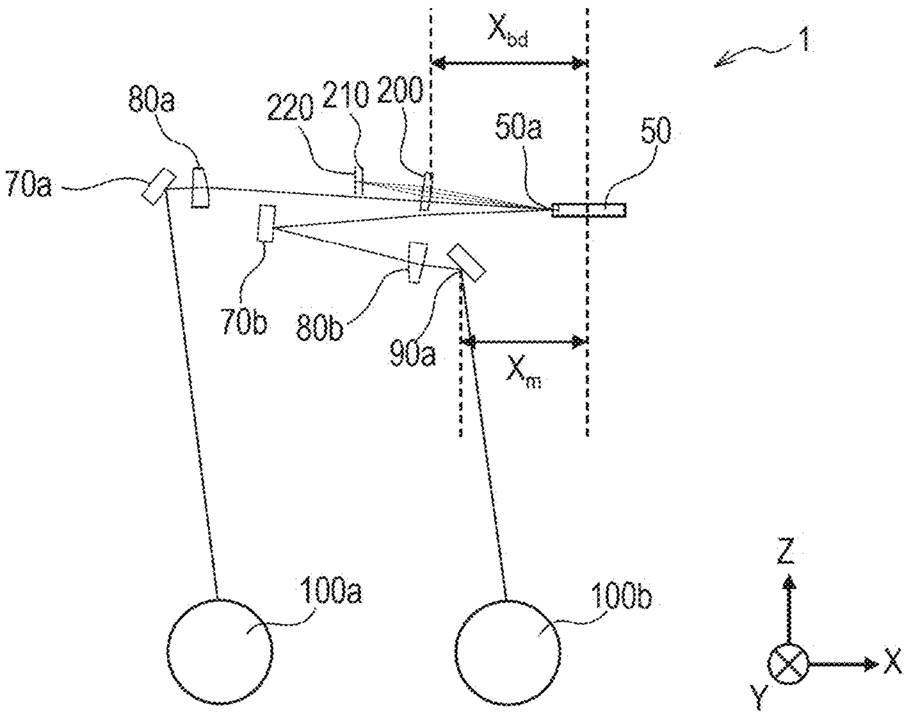
FIG. 8B is a partial sub-scanning cross sectional view of the light scanning apparatus according to the first embodiment.

FIGS. 8A and 8B show a partial developed view in the main scanning cross section and a partial sub-scanning cross sectional view for explaining each inequality in the light scanning apparatus 1 according to the present embodiment, respectively.

First, an angle (an acute angle) formed by the optical axis of the first incident optical system 75*a* and the optical axis of the first imaging optical system 85*a* when they are projected in the main scanning cross section is defined as $\theta_{im}$ (radian).

At this time, it is preferred that the following inequality (6) is satisfied in the light scanning apparatus 1 according to the present embodiment:

$$1.00 < \theta_{im} < 1.50. \tag{6}$$

When the value exceeds the upper limit value in the inequality (6), vignetting in the deflecting unit 50 is likely to occur, and if the position of the first light source 10*a* is shifted in order to suppress the vignetting, the optical characteristics are likely to deteriorate.

On the other hand, when the value falls below the lower limit value in the inequality (6), the first incident optical system 75*a* and the first imaging optical system 85*a* are likely to interfere with each other.

In the light scanning apparatus 1 according to the present embodiment, it is more preferred that the following inequality (6a) is satisfied:

$$1.20 < \theta_{im} < 1.50. \tag{6a}$$

In the light scanning apparatus 1 according to the present embodiment, $\theta_{im}$ is 1.36 as shown in Table 1, so that the inequalities (6) and (6a) are satisfied.

Further, an angle (an acute angle) formed by the optical axis of the synchronization detection optical system 95 and the optical axis of the first imaging optical system 85*a* when they are projected in the main scanning cross section is defined as $\theta_{bd}$ (radian).

At this time, it is preferred that the following inequality (7) is satisfied in the light scanning apparatus 1 according to the present embodiment:

$$0.80 < \theta_{bd}/\theta_{im} < 0.95. \quad (7)$$

When the ratio exceeds the upper limit value in the inequality (7), the synchronization detection optical system 95 becomes too close to the first incident optical system 75*a*.

Therefore, the first light flux LA guided by the synchronization detection optical system 95 and the first light flux LA guided by the first incident optical system 75*a* are likely to interfere with each other.

On the other hand, when the ratio falls below the lower limit value in the inequality (7), the synchronization detection optical system 95 becomes too close to the first imaging optical system 85*a*.

Therefore, the first light flux LA guided by the synchronization detection optical system 95 and the first light flux LA guided by the first imaging optical system 85*a* are likely to interfere with each other.

In the light scanning apparatus 1 according to the present embodiment, it is more preferred that the following inequality (7a) is satisfied:

$$0.84 < \theta_{bd}/\theta_{im} < 0.95. \quad (7a)$$

In the light scanning apparatus 1 according to the present embodiment, $\theta_{bd}/\theta_{im}$ is 0.91 as shown in Table 1, so that the inequalities (7) and (7a) are satisfied.

Further, a distance on the optical axis of the synchronization detection optical system 95 between the synchronization detection sensor 220 and a deflection point on the deflecting surface 50*a* of a principal ray of the first light flux LA deflected in a predetermined direction by the deflecting unit 50 so as to reach the synchronization detection sensor 220 is defined as $D_{bd}$.

That is, the distance $D_{bd}$ is a distance between the deflection point on the deflecting surface 50*a* of the principal ray of the first light flux LA guided by the synchronization detection optical system 95 to an intersecting point of the optical axis of the synchronization detection optical system 95 and a light receiving surface of the synchronization detection sensor 220, and the intersecting point.

Then, when a focal length in the main scanning cross section of the synchronization detection lens 200 is defined as $F_{bd}$, it is preferred that the following inequality (8) is satisfied in the light scanning apparatus 1 according to the present embodiment:

$$0.30 < F_{bd}/D_{bd} < 0.70. \quad (8)$$

When the ratio exceeds the upper limit value in the inequality (8), the synchronization detection lens 200 becomes too close to the deflecting unit 50.

Therefore, the first light flux LA guided by the synchronization detection optical system 95 is likely to interfere with the first light flux LA guided by the first incident optical system 75*a*, and the first light flux LA guided by the first imaging optical system 85*a*.

On the other hand, when the ratio falls below the lower limit value in the inequality (8), the focal length $F_{bd}$ in the main scanning cross section of the synchronization detection lens 200 becomes too short, so that an optical sensitivity increases.

In the light scanning apparatus 1 according to the present embodiment, it is more preferred that the following inequality (8a) is satisfied:

$$0.30 < F_{bd}/D_{bd} < 0.50. \quad (8a)$$

In the light scanning apparatus 1 according to the present embodiment, $F_{bd}/D_{bd}$ is 0.37 as shown in Table 1, so that the inequalities (8) and (8a) are satisfied.

Further, a direction parallel to a straight line passing through a first intersecting point of the first scanned surface 100*a* and the optical axis of the first imaging optical system 85*a* and a second intersecting point of the second scanned surface 100*b* and the optical axis of the second imaging optical system 85*b* is defined.

Then, a distance between the rotation center of the deflecting unit 50 and a center of an incident surface of the synchronization detection lens 200 in this direction is defined as $X_{bd}$.

A distance between the rotation center of the deflecting unit 50 and a center of an incident surface of a predetermined optical element arranged closest to the deflecting unit 50 among imaging optical elements and reflecting elements provided on the optical paths of the first and second light fluxes LA and LB in this direction is defined as $X_m$.

At this time, it is preferred that the following inequality (9) is satisfied in the light scanning apparatus 1 according to the present embodiment:

$$0.60 < X_m/X_{bd} < 1.50. \quad (9)$$

When the ratio exceeds the upper limit value in the inequality (9), the imaging optical elements and the reflecting elements provided on the optical paths of the first and second light fluxes LA and LB become too far away from the deflecting unit 50, which makes it difficult to shorten the distance DP between the first and second photosensitive drums 100*a* and 100*b*.

On the other hand, when the ratio falls below the lower limit value in the inequality (9), a predetermined optical element included in the imaging optical element and the reflecting element provided on the optical paths of the first and second light fluxes LA and LB becomes too close to the deflecting unit 50, which may increase the size in the sub-scanning direction of the housing 2.

In addition, When the ratio falls below the lower limit value in the inequality (9), the predetermined optical element is likely to interfere with imaging optical elements and reflecting elements, which are provided on the opposite side with respect to the deflecting unit 50 and through which the third and fourth light fluxes LC and LD pass.

In the light scanning apparatus 1 according to the present embodiment, it is more preferred that the following inequality (9a) is satisfied:

$$0.70 < X_m/X_{bd} < 1.20. \tag{9a}$$

In the light scanning apparatus 1 according to the present embodiment, the optical element arranged closest to the deflecting unit 50 is the second reflecting element 90*a* among the imaging optical elements and the reflecting elements provided on the optical paths of the first and second light fluxes LA and LB.

Therefore, $X_m/X_{bd}$ is 0.84 as shown in Table 1, so that the inequalities (9) and (9a) are satisfied.

As described above, in the light scanning apparatus 1 according to the present embodiment, the deflecting unit 50 and the synchronization detection lens 200 are provided on sides opposite to each other with respect to the bottom surface 2*a* of the housing 2.

Thereby, it is possible to reduce the size in the direction perpendicular to each of the main scanning direction and the sub-scanning direction, namely in the optical axis directions of the first to fourth imaging optical systems 85*a* to 85*d* in the light scanning apparatus 1 according to the present embodiment.

Second Embodiment

Figure 9A:
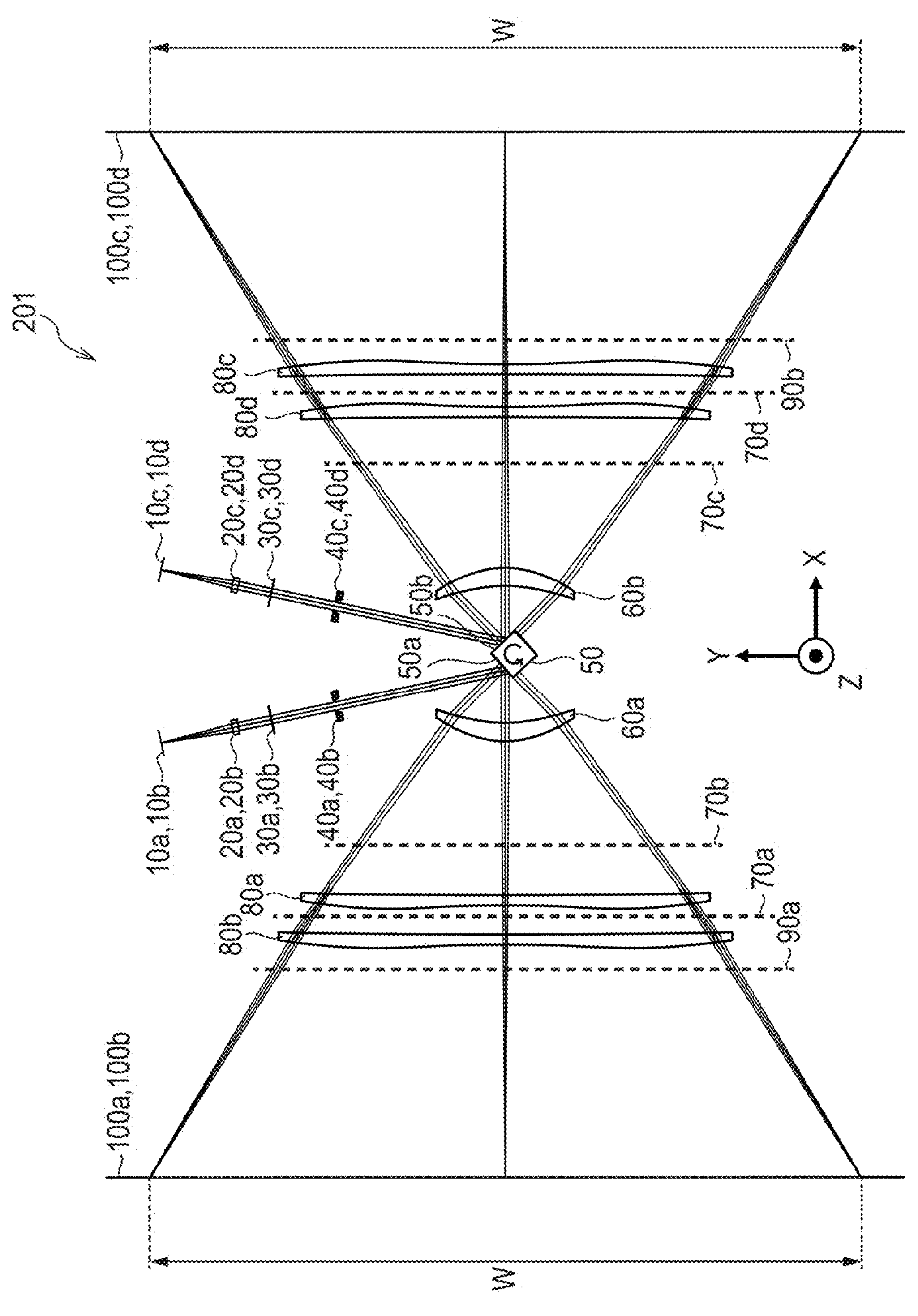
FIG. 9A is a partial developed view in the main scanning cross section of the light scanning apparatus according to a second embodiment of the present invention.
Figure 9B:
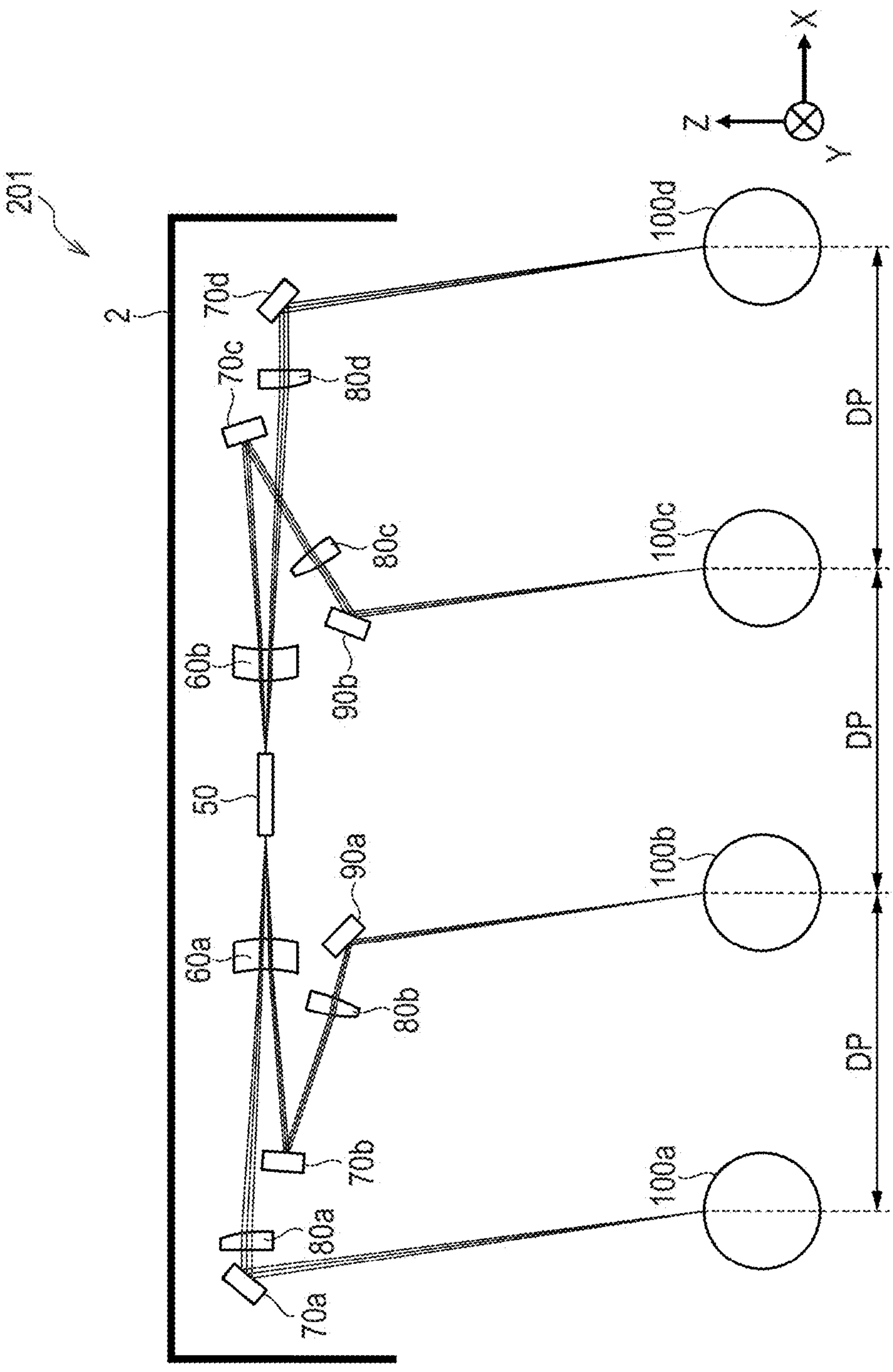
FIG. 9B is a partial sub-scanning cross sectional view of the light scanning apparatus according to the second embodiment.

FIGS. 9A and 9B show a partial developed view in the main scanning cross section (corresponding to FIGS. 1A and 1B) and a partial sub-scanning cross sectional view (corresponding to FIG. 2C) of a light scanning apparatus 201 according to a second embodiment of the present invention, respectively.

Figure 10A:
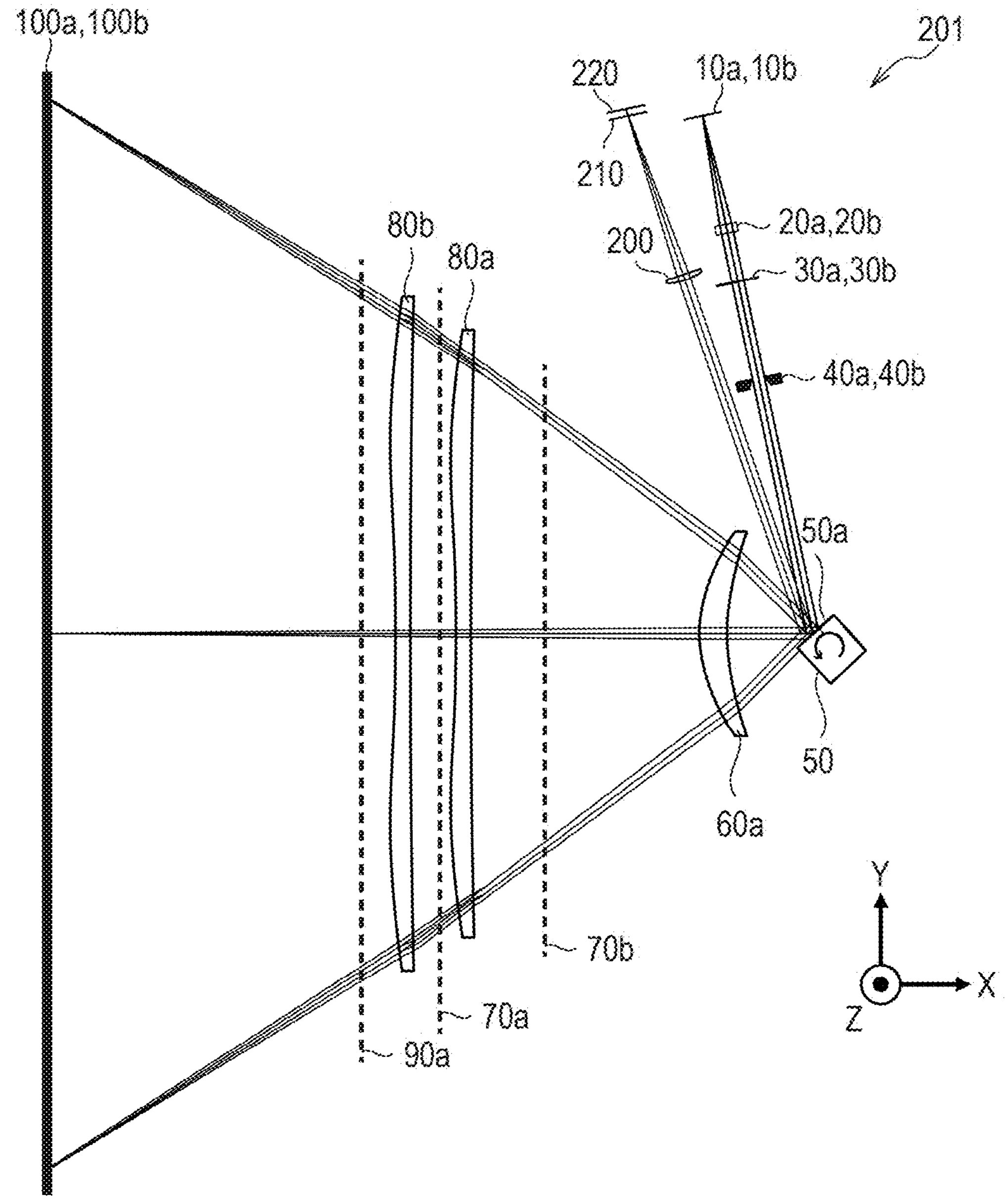
FIG. 10A is a partial developed view in the main scanning cross section of the light scanning apparatus according to the second embodiment.
Figure 10B:
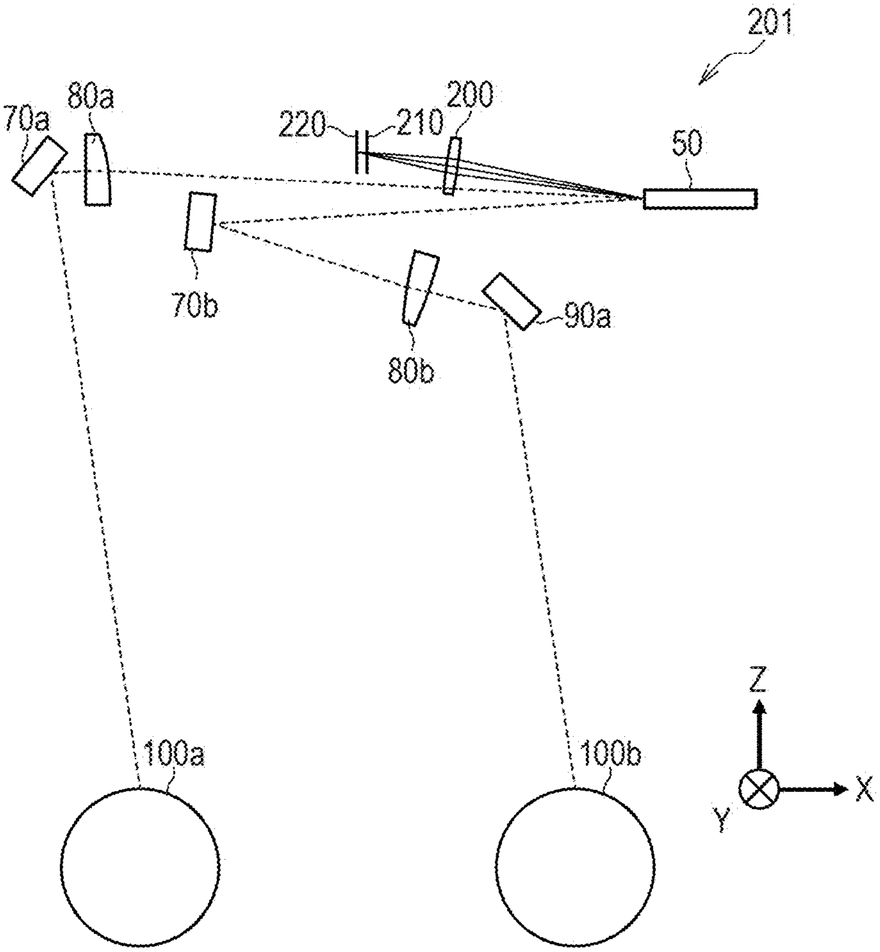
FIG. 10B is a partial sub-scanning cross sectional view of the light scanning apparatus according to the second embodiment.

Further, FIGS. 10A and 10B show a partial developed view in the main scanning cross section (corresponding to FIG. 3A) and a partial sub-scanning cross sectional view (corresponding to FIG. 3B) of the light scanning apparatus 201 according to the second embodiment, respectively.

Note that the light scanning apparatus 201 according to the present embodiment has the same configuration as that of the light scanning apparatus 1 according to the first embodiment except that numerical values are different, so that the same members are denoted by the same reference numerals, and description thereof is omitted.

In addition, Tables 4, 5, 6-1, 6-2 and 6-3 below show the specification values, a refractive index and coordinates of each optical element, and shapes of optical surfaces of each optical element in the light scanning apparatus 201 according to the present embodiment.

Note that Tables 5, 6-1, 6-2 and 6-3 show only the first and second incident optical systems 75*a* and 75*b*, the first and second imaging optical systems 85*a* and 85*b*, and the synchronization detection optical system 95.

That is, the third and fourth incident optical systems 75*c* and 75*d*, and the third and fourth imaging optical systems 85*c* and 85*d* are omitted in Tables 5, 6-1, 6-2 and 6-3.

TABLE 4

| Item | Parameter [Unit] | Value |
|---|---|---|
| Design wavelength of first to fourth light fluxes LA to LD from first to fourth light sources 10a to 10d | λ [nm] | 790 |
| Scanning width of first to fourth scanned surface 100a to 100d in main scanning direction | W [mm] | 326 |
| Distance between adjacent photosensitive drums | DP [mm] | 83 |
| Number of deflecting surfaces in deflecting unit 50 | [Surfaces] | 4 |
| Circumscribed diameter of deflecting unit 50 | Pd [mm] | 20 |
| Coordinates of rotation center of deflecting unit 50 | (X, Y) [mm] | (6.03, −3.79) |
| Angle in main scanning cross section between optical axes of first to fourth incident optical systems 75a to 75d and optical axes of first to fourth imaging optical systems 85a to 85d | θim [rad] | 1.36 |
| Absolute value of incident angle in sub-scanning cross section of first to fourth light fluxes LA to LD to deflecting surfaces 50a and 50b of deflecting unit 50 | θis [rad] | 0.05 |
| Angle in main scanning cross section between optical axis of synchronization detection optical system 95 and optical axes of first and second imaging optical systems 85a and 85b | θbd [rad] | 1.20 |
| Width in main scanning direction of opening portion of first to fourth main scanning stops 40a to 40d | Am [mm] | 3.75 |
| Width in sub-scanning direction of opening portion of first to fourth sub-scanning stops 30a to 30d | As [mm] | 2.84 |
| Focal length in main scanning cross section of synchronization detection lens 200 | Fbd [mm] | 53.58 |
| Distance on optical axis between deflection point on deflecting surface of deflecting unit 50 and synchronization detection sensor 220 | Dbd [mm] | 169.20 |
| Distance in X direction between rotation center of deflecting unit 50 and center of incident surface of synchronization detection lens 200 | Xm [mm] | 33.58 |
| Distance in X direction between rotation center of deflecting unit 50 and center of incident surface of second reflecting element 90a | Xbd [mm] | 43.37 |

TABLE 5

| Optical surface | Refractive index (λ = 790 nm) | Coordinates of surface vertex tc(x) | tc(y) | tc(z) | Direction cosine of optical axis gx(x) | tc(x) | tc(y) |
|---|---|---|---|---|---|---|---|
| Light emitting point of first light source 10a | — | −33.58 | 157.99 | −7.62 | −0.21 | 0.98 | −0.05 |
| Incident surface of first incident optical element 20a | 1.53 | −26.61 | 125.17 | −6.03 | −0.21 | 0.98 | −0.05 |

TABLE 5-continued

| Optical surface | Refractive index (λ = 790 nm) | Coordinates of surface vertex tc(x) | tc(y) | tc(z) | Direction cosine of optical axis gx(x) | tc(x) | tc(y) |
|---|---|---|---|---|---|---|---|
| Exit surface of first incident optical element 20a | — | −25.98 | 122.24 | −5.89 | −0.21 | 0.98 | −0.05 |
| First sub-scanning stop 30a | — | −22.84 | 107.44 | −5.18 | −0.21 | 0.98 | 0.00 |
| First main scanning stop 40a | — | −16.63 | 78.25 | −3.77 | −0.21 | 0.98 | 0.00 |
| Deflecting surface 50a of deflecting unit 50 (when scanning on-axis image height) | — | 0.53 | 0.66 | 0.00 | −0.78 | 0.63 | 0.00 |
| Incident surface of upper portion 60au of first imaging optical element | 1.53 | −26.00 | 0.00 | 0.00 | −1.00 | 0.00 | 0.00 |
| Exit surface of upper portion 60au of first imaging optical element | — | −34.20 | 0.00 | 0.00 | −1.00 | 0.00 | 0.00 |
| Incident surface of second imaging optical element 80a | 1.53 | −103.50 | 0.00 | 5.03 | −1.00 | 0.00 | 0.00 |
| Exit surface of second imaging optical element 80a | — | −107.80 | 0.00 | 5.03 | −1.00 | 0.00 | 0.00 |
| Reflecting surface of first reflecting element 70a | — | −114.19 | 5.00 | 4.98 | −0.76 | 0.00 | 0.65 |
| First scanned surface 100a | — | −97.70 | 0.00 | −112.69 | −0.15 | 0.00 | 0.99 |
| Light emitting point of second light source 10b | — | −33.58 | 157.99 | 7.62 | −0.21 | 0.98 | 0.05 |
| Incident surface of second incident optical element 20b | 1.53 | −26.61 | 125.17 | 6.03 | −0.21 | 0.98 | 0.05 |
| Exit surface of second incident optical element 20b | — | −25.98 | 122.24 | 5.89 | −0.21 | 0.98 | 0.05 |
| Second sub-scanning stop 30b | — | −22.84 | 107.44 | 5.18 | −0.21 | 0.98 | 0.00 |
| Second main scanning stop 40b | — | −16.63 | 78.25 | 3.77 | −0.21 | 0.98 | 0.00 |
| Deflecting surface 50a of deflecting unit 50 (when scanning on-axis image height) | — | 0.53 | 0.66 | 0.00 | −0.78 | 0.63 | 0.00 |
| Incident surface of lower portion 60al of first imaging optical element | 1.53 | −26.00 | 0.00 | 0.00 | −1.00 | 0.00 | 0.00 |
| Exit surface of lower portion 60al of first imaging optical element | — | −34.20 | 0.00 | 0.00 | −1.00 | 0.00 | 0.00 |

TABLE 5-continued

| Optical surface | Refractive index (λ = 790 nm) | Coordinates of surface vertex tc(x) | tc(y) | tc(z) | Direction cosine of optical axis gx(x) | tc(x) | tc(y) |
|---|---|---|---|---|---|---|---|
| Incident surface of second imaging optical element 80b | 1.53 | −46.37 | 0.00 | −17.30 | −0.97 | 0.00 | 0.26 |
| Exit surface of second imaging optical element 80b | — | −42.22 | 0.00 | −18.43 | −0.97 | 0.00 | 0.26 |
| Reflecting surface of first reflecting element 70b | — | −83.25 | 0.00 | −5.28 | −0.99 | 0.00 | 0.13 |
| Reflecting surface of second reflecting element 90a | — | −27.55 | −3.50 | −21.93 | −0.74 | 0.00 | −0.67 |
| Second scanned surface 100b | — | −14.70 | 0.00 | −112.69 | 0.17 | 0.00 | −0.99 |
| Incident surface of synchronization detection lens 200 | 1.49 | −37.34 | 109.13 | 5.27 | −0.33 | 0.94 | 0.05 |
| Exit surface of synchronization detection lens 200 | — | −37.99 | 111.02 | 5.36 | −0.33 | 0.94 | 0.05 |
| Synchronization detection slit 210 | — | −54.46 | 158.84 | 7.75 | −0.21 | 0.98 | 0.00 |
| Synchronization detection sensor 220 | — | −55.11 | 160.72 | 7.84 | −0.21 | 0.98 | 0.00 |

TABLE 6-1

| | | Aspherical surface coefficient | | | | | |
|---|---|---|---|---|---|---|---|
| | | First incident optical element 20a | | Upper portion 60au of first imaging optical element | | Second imaging optical element 80a | |
| | Coefficient | Incident surface | Exit surface | Incident surface | Exit surface | Incident surface | Exit surface |
| Meridional line | R | — | −3.72E+01 | −7.11E+01 | −4.29E+01 | 4.00E+03 | 3.50E+02 |
| | K | — | — | 9.46E−01 | −5.15E−01 | — | −8.75E+01 |
| | B3 | — | — | — | — | — | — |
| | B4 | — | — | −9.15E−07 | −3.48E−07 | — | −2.02E−07 |
| | B5 | — | — | — | — | — | — |
| | B6 | — | — | 6.78E−09 | 1.69E−09 | — | 1.61E−11 |
| | B7 | — | — | — | — | — | — |
| | B8 | — | — | −5.77E−12 | 1.11E−12 | — | −9.31E−16 |
| | B9 | — | — | — | — | — | — |
| | B10 | — | — | 1.64E−15 | −1.22E−15 | — | 2.52E−20 |
| Sagittal line | r | — | −2.62E+01 | 2.00E+01 | 2.50E+01 | 3.71E+01 | −1.54E+02 |
| | E1 | — | — | — | — | — | −1.28E−07 |
| | E2 | — | — | — | 1.52E−05 | −7.46E−07 | 1.81E−06 |
| | E3 | — | — | — | — | — | −3.24E−09 |
| | E4 | — | — | — | 8.49E−10 | — | −3.04E−10 |
| | E5 | — | — | — | — | — | 1.34E−12 |
| | E6 | — | — | — | −2.51E−11 | — | 3.08E−14 |
| | E7 | — | — | — | — | — | −2.01E−16 |
| | E8 | — | — | — | 7.61E−15 | — | −1.95E−18 |
| | E9 | — | — | — | — | — | 9.86E−21 |
| | E10 | — | — | — | 1.61E−17 | — | 5.81E−23 |
| Additional term | M0_1 | — | — | — | −2.12E−02 | −1.01E−01 | 2.32E−02 |
| | M1_1 | — | — | — | — | −2.13E−04 | −2.00E−04 |
| | M2_1 | — | — | — | 3.32E−05 | −1.31E−05 | −2.37E−05 |
| | M3_1 | — | — | — | — | 1.16E−07 | 1.06E−07 |
| | M4_1 | — | — | — | — | 1.77E−09 | 3.67E−09 |

TABLE 6-1-continued

| Coefficient | Aspherical surface coefficient: First incident optical element 20a, Incident surface | First incident optical element 20a, Exit surface | Upper portion 60au of first imaging optical element, Incident surface | Upper portion 60au of first imaging optical element, Exit surface | Second imaging optical element 80a, Incident surface | Second imaging optical element 80a, Exit surface |
|---|---|---|---|---|---|---|
| M5_1 | — | — | — | — | −1.62E−11 | −1.41E−11 |
| M6_1 | — | — | — | — | 3.01E−13 | −3.05E−13 |
| M7_1 | — | — | — | — | 1.06E−15 | 9.73E−16 |
| M8_1 | — | — | — | — | −1.31E−17 | 6.57E−17 |
| M9_1 | — | — | — | — | −1.66E−20 | −1.73E−20 |
| M10_1 | — | — | — | — | −8.54E−22 | −3.96E−21 |
| C3 | −8.67E−03 | — | — | — | — | — |
| C5 | −7.85E−03 | — | — | — | — | — |

TABLE 6-2

| | Coefficient | Aspherical surface coefficient: Second incident optical element 20b, Incident surface | Second incident optical element 20b, Exit surface | Lower portion 60al of first imaging optical element, Incident surface | Lower portion 60al of first imaging optical element, Exit surface | Second imaging optical element 80b, Incident surface | Second imaging optical element 80b, Exit surface |
|---|---|---|---|---|---|---|---|
| Meridional line | R | — | −3.72E+01 | −7.11E+01 | −4.38E+01 | 4.00E+03 | −3.80E+02 |
| | K | — | — | 9.46E−01 | −9.32E−01 | — | −7.41E+01 |
| | B3 | — | — | — | — | — | — |
| | B4 | — | — | −9.15E−07 | −1.35E−06 | — | 1.33E−07 |
| | B5 | — | — | — | — | — | — |
| | B6 | — | — | 6.78E−09 | 1.72E−09 | — | −7.21E−12 |
| | B7 | — | — | — | — | — | — |
| | B8 | — | — | −5.77E−12 | 8.76E−13 | — | 3.07E−16 |
| | B9 | — | — | — | — | — | — |
| | B10 | — | — | 1.64E−15 | −1.07E−15 | — | −6.09E−21 |
| Sagittal line | r | — | −2.62E+01 | 2.00E+01 | 5.53E+01 | −3.74E+01 | 2.50E+02 |
| | E1 | — | — | — | — | — | −9.41E−09 |
| | E2 | — | — | — | 6.89E−06 | 3.48E−07 | −1.45E−06 |
| | E3 | — | — | — | — | — | 1.62E−09 |
| | E4 | — | — | — | 8.42E−08 | — | 2.79E−10 |
| | E5 | — | — | — | — | — | −4.72E−13 |
| | E6 | — | — | — | −2.68E−10 | — | −4.45E−14 |
| | E7 | — | — | — | — | — | 5.35E−17 |
| | E8 | — | — | — | 3.44E−13 | — | 3.94E−18 |
| | E9 | — | — | — | — | — | −2.03E−21 |
| | E10 | — | — | — | −1.54E−16 | — | −1.36E−22 |
| Additional term | M0_1 | — | — | — | 7.66E−02 | −1.21E−01 | 5.80E−02 |
| | M1_1 | — | — | — | — | −2.13E−04 | −2.00E−04 |
| | M2_1 | — | — | — | −3.91E−05 | −1.11E−05 | −2.29E−05 |
| | M3_1 | — | — | — | — | 1.42E−07 | 1.29E−07 |
| | M4_1 | — | — | — | — | 5.56E−10 | 2.63E−09 |
| | M5_1 | — | — | — | — | −2.59E−11 | −2.17E−11 |
| | M6_1 | — | — | — | — | 2.46E−13 | −2.07E−13 |
| | M7_1 | — | — | — | — | 2.15E−15 | 1.68E−15 |
| | M8_1 | — | — | — | — | −1.18E−17 | 3.21E−17 |
| | M9_1 | — | — | — | — | −6.13E−20 | −4.20E−20 |
| | M10_1 | — | — | — | — | −9.72E−23 | −1.49E−21 |
| | C3 | −8.67E−03 | — | — | — | — | — |
| | C5 | −7.85E−03 | — | — | — | — | — |

TABLE 6-3

| Aspherical surface coefficient | | |
|---|---|---|
| | Synchronization detection lens 200 | |
| Coefficient | Incident surface | Exit surface |
| Curvature radius of meridional line R | 2.60E+01 | — |
| Curvature radius of sagittal line r | 2.60E+01 | −6.00E+01 |

Figure 11A:
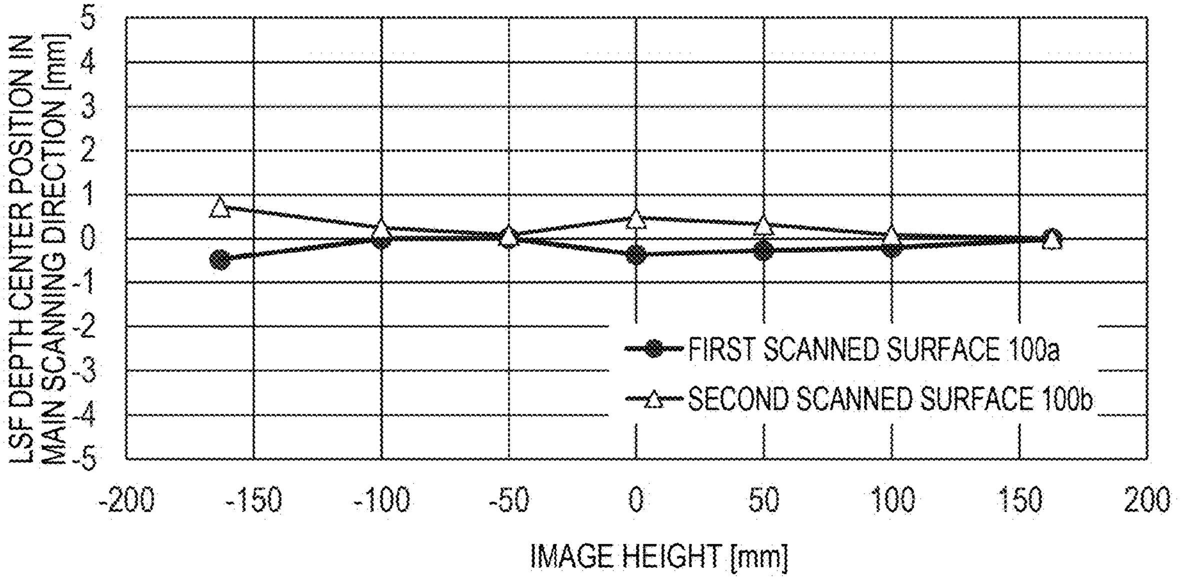
FIG. 11A is a view showing an image height dependence of the LSF depth center position in the main scanning direction on each scanned surface in the light scanning apparatus according to the second embodiment.
Figure 11B:
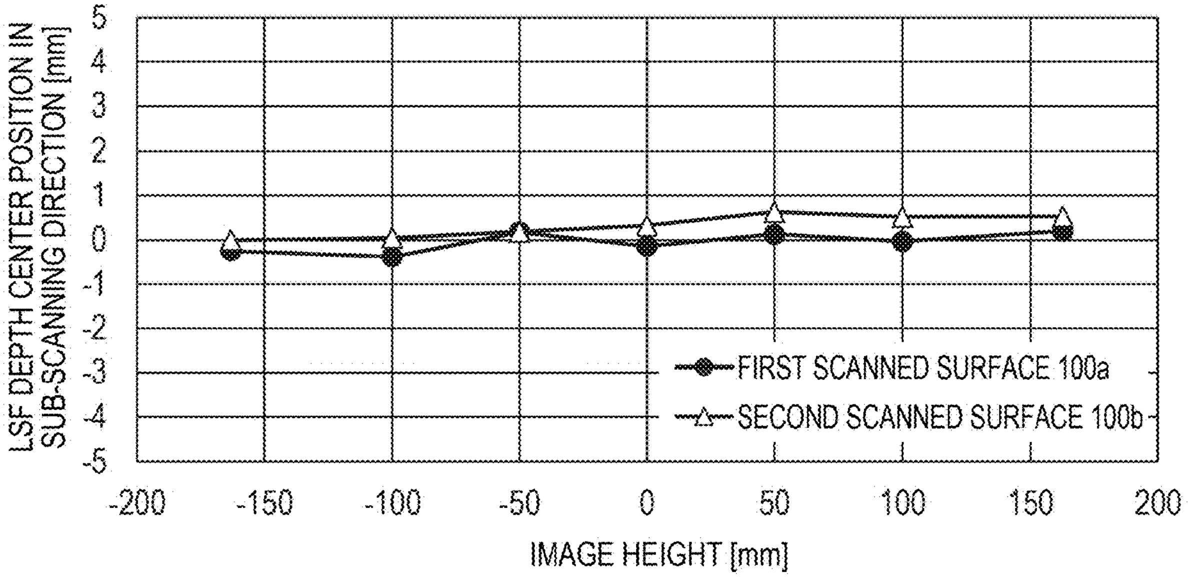
FIG. 11B is a view showing an image height dependence of the LSF depth center position in the sub-scanning direction on each scanned surface in the light scanning apparatus according to the second embodiment.

FIGS. 11A and 11B show image height dependencies of the LSF depth center position in the main scanning direction and the LSF depth center position in the sub-scanning direction on each scanned surface in the light scanning apparatus 201 according to the present embodiment, respectively.

As shown in FIGS. 11A and 11B, both of the LSF depth center position in the main scanning direction and the LSF depth center position in the sub-scanning direction are within the range of +1 mm over the entire image height, so that it can be seen that the light scanning apparatus 201 according to the present embodiment achieves a favorable imaging performance.

In the light scanning apparatus 201 according to the present embodiment, DP/W is obtained as 0.25, so that the inequality (5) is satisfied.

Since $\theta_{im}$ is 1.36, the inequalities (6) and (6a) are satisfied.

$\theta_{bd}/\theta_{im}$ is obtained as 0.88, so that the inequalities (7) and (7a) are satisfied.

$F_{bd}/D_{bd}$ is obtained as 0.32, so that the inequalities (8) and (8a) are satisfied.

$X_m/X_{bd}$ is obtained as 0.77, so that the inequalities (9) and (9a) are satisfied.

As described above, in the light scanning apparatus 201 according to the present embodiment, the deflecting unit 50 and the synchronization detection lens 200 are provided on sides opposite to each other with respect to the bottom surface 2*a* of the housing 2.

Thereby, it is possible to reduce the size in the direction perpendicular to each of the main scanning direction and the sub-scanning direction, namely in the optical axis directions of the first to fourth imaging optical systems 85*a* to 85*d* in the light scanning apparatus 201 according to the present embodiment.

Third Embodiment

Figure 12A:
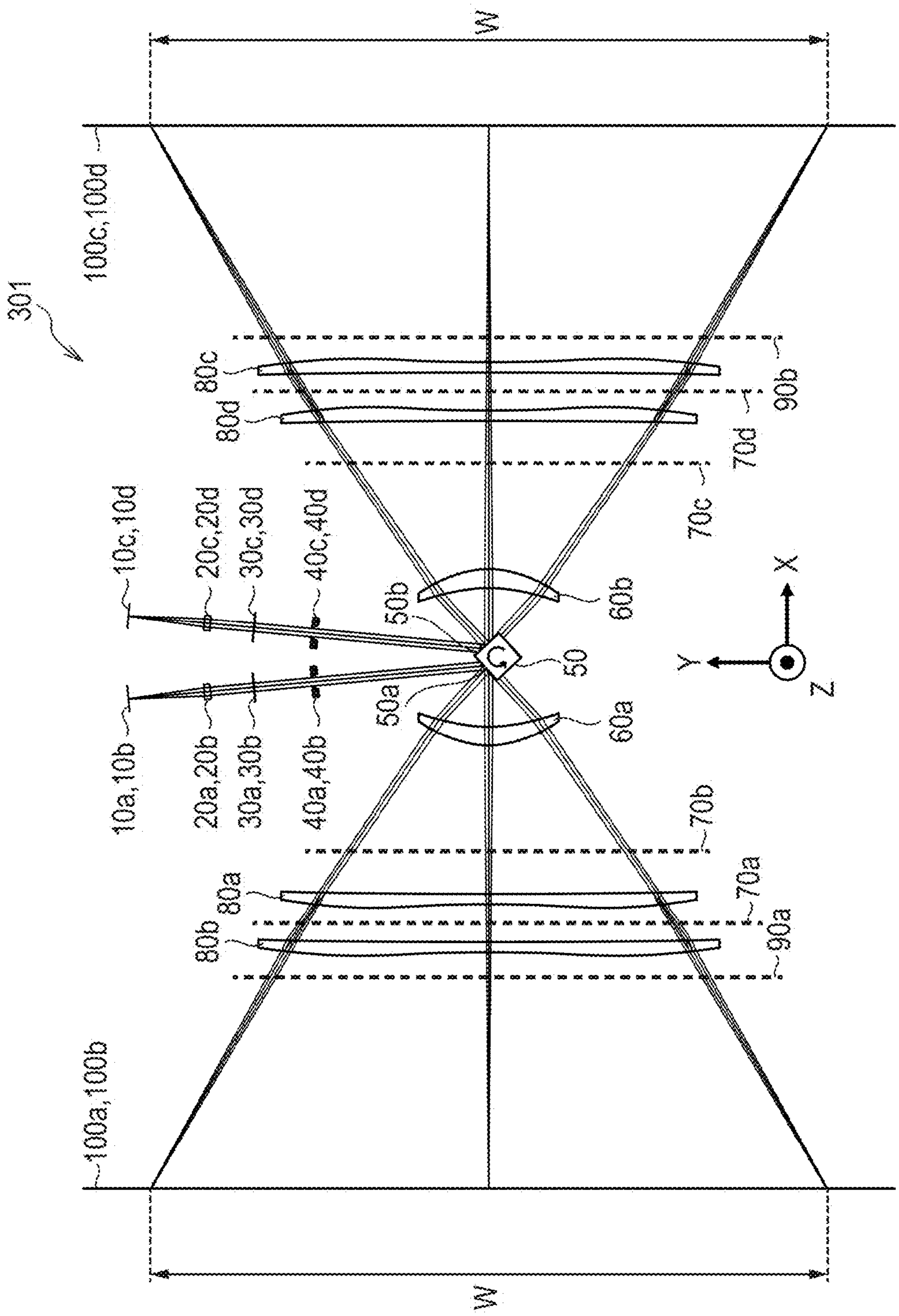
FIG. 12A is a partial developed view in the main scanning cross section of the light scanning apparatus according to a third embodiment of the present invention.
Figure 12B:
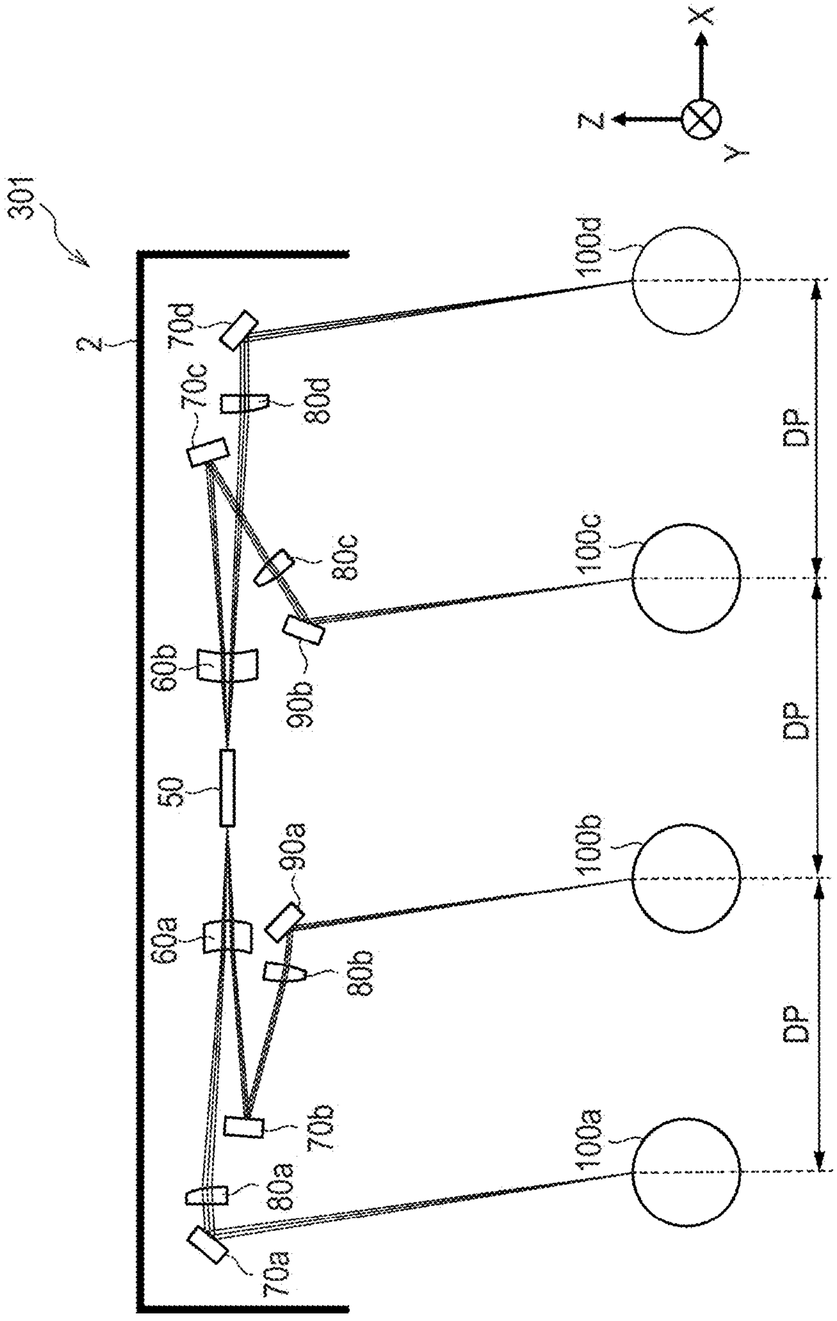
FIG. 12B is a partial sub-scanning cross sectional view of the light scanning apparatus according to the third embodiment.

FIGS. 12A and 12B show a partial developed view in the main scanning cross section (corresponding to FIGS. 1A and 1B) and a partial sub-scanning cross sectional view (corresponding to FIG. 2C) of a light scanning apparatus 301 according to a third embodiment of the present invention, respectively.

Figure 13A:
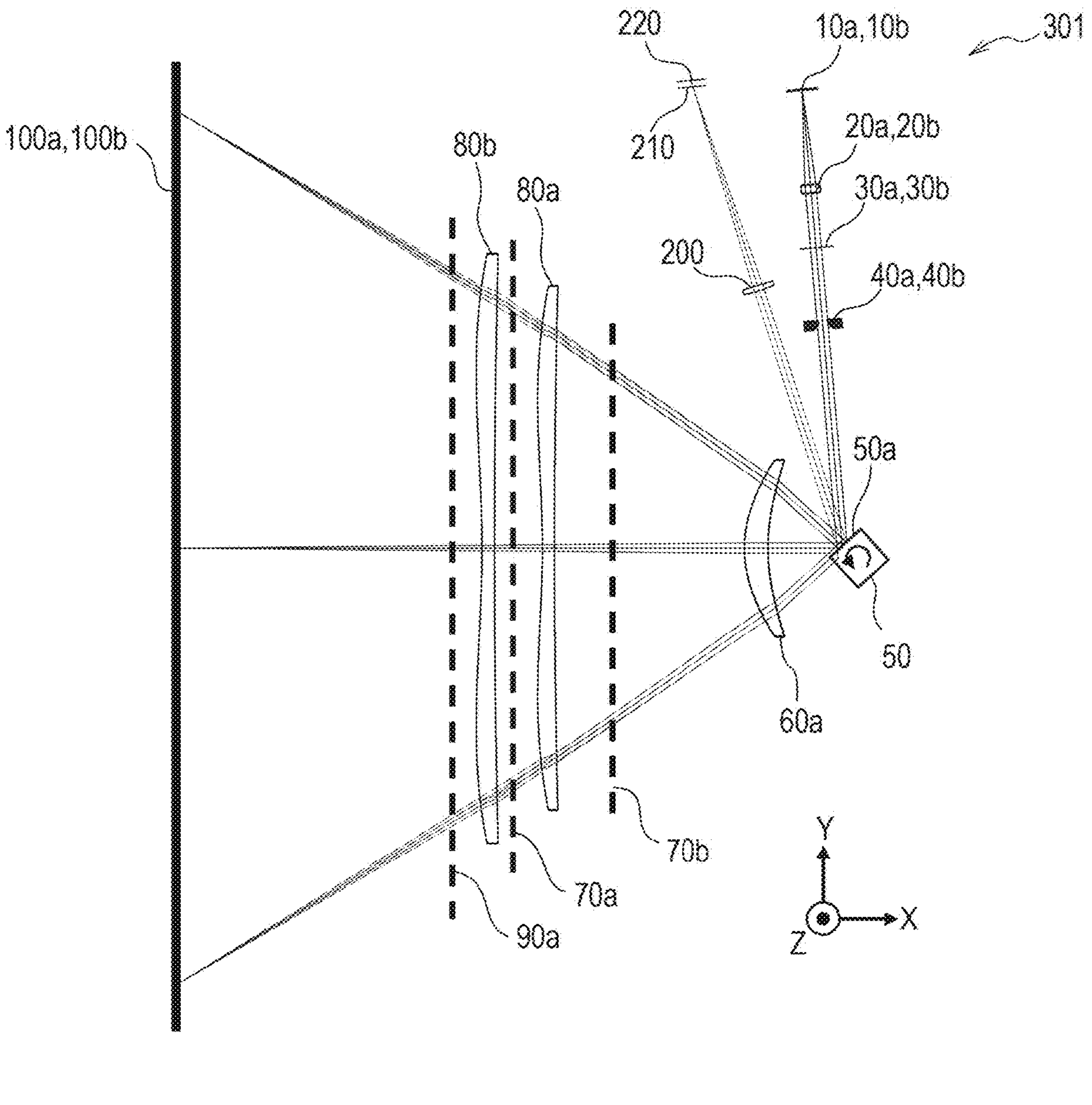
FIG. 13A is a partial developed view in the main scanning cross section of the light scanning apparatus according to the third embodiment.
Figure 13B:
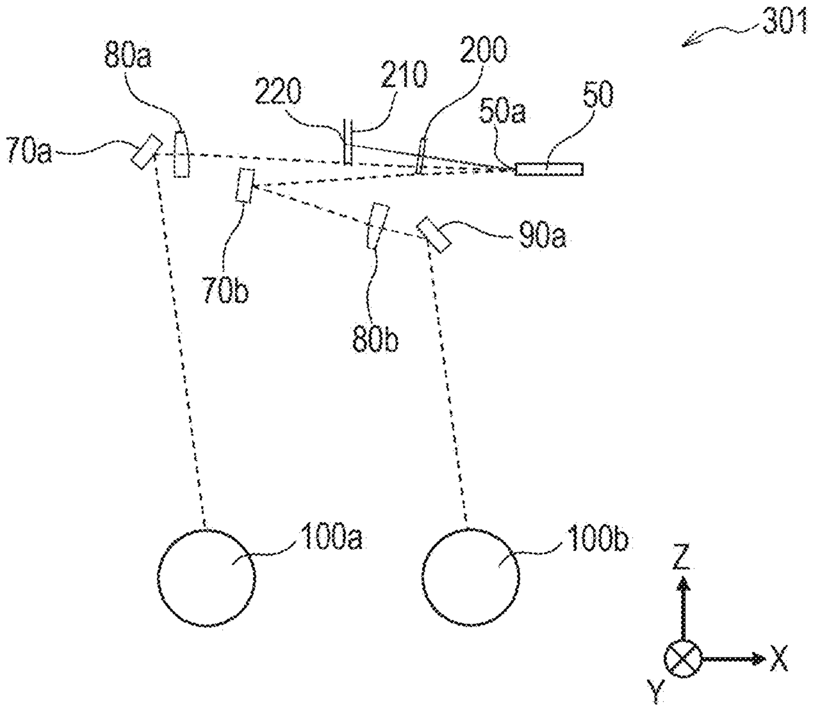
FIG. 13B is a partial sub-scanning cross sectional view of the light scanning apparatus according to the third embodiment.

Further, FIGS. 13A and 13B show a partial developed view in the main scanning cross section (corresponding to FIG. 3A) and a partial sub-scanning cross sectional view (corresponding to FIG. 3B) of the light scanning apparatus 301 according to the third embodiment, respectively.

Note that the light scanning apparatus 301 according to the present embodiment has the same configuration as that of the light scanning apparatus 1 according to the first embodiment except that numerical values are different, so that the same members are denoted by the same reference numerals, and description thereof is omitted.

In addition, Tables 7, 8, 9-1, 9-2 and 9-3 below show specification values, a refractive index and coordinates of each optical element, and shapes of optical surfaces of each optical element in the light scanning apparatus 301 according to the present embodiment.

Note that Tables 8, 9-1, 9-2 and 9-3 show only the first and second incident optical systems 75*a* and 75*b*, the first and second imaging optical systems 85*a* and 85*b*, and the synchronization detection optical system 95.

That is, the third and fourth incident optical systems 75*c* and 75*d*, and the third and fourth imaging optical systems 85*c* and 85*d* are omitted in Tables 8, 9-1, 9-2 and 9-3.

TABLE 7

| Item | Parameter [Unit] | Value |
|---|---|---|
| Design wavelength of first to fourth light fluxes LA to LD from first to fourth light sources 10a to 10d | λ [nm] | 790 |
| Scanning width of first to fourth scanned surface 100a to 100d in main scanning direction | W [mm] | 296 |
| Distance between adjacent photosensitive drums | DP [mm] | 83 |
| Number of deflecting surfaces in deflecting unit 50 | [Surfaces] | 4 |
| Circumscribed diameter of deflecting unit 50 | Pd [mm] | 20 |
| Coordinates of rotation center of deflecting unit 50 | (X, Y) [mm] | (6.03, −3.79) |
| Angle in main scanning cross section between optical axes of first to fourth incident optical systems 75a to 75d and optical axes of first to fourth imaging optical systems 85a to 85d | θim [rad] | 1.48 |
| Absolute value of incident angle in sub-scanning cross section of first to fourth light fluxes LA to LD to deflecting surfaces 50a and 50b of deflecting unit 50 | θis [rad] | 0.05 |
| Angle in main scanning cross section between optical axis of synchronization detection optical system 95 and optical axes of first and second imaging optical systems 85a and 85b | θbd [rad] | 1.26 |
| Width in main scanning direction of opening portion of first to fourth main scanning stops 40a to 40d | Am [mm] | 3.75 |
| Width in sub-scanning direction of opening portion of first to fourth sub-scanning stops 30a to 30d | As [mm] | 2.84 |
| Focal length in main scanning cross section of synchronization detection lens 200 | Fbd [mm] | 78.23 |
| Distance on optical axis between deflection point on deflecting surface of deflecting unit 50 and synchronization detection sensor 220 | Dbd [mm] | 169.20 |
| Distance in X direction between rotation center of deflecting unit 50 and center of incident surface of synchronization detection lens 200 | Xm [mm] | 34.13 |
| Distance in X direction between rotation center of deflecting unit 50 and center of incident surface of second reflecting element 90a | Xbd [mm] | 34.21 |

TABLE 8

| Optical surface | Refractive index (λ = 790 nm) | Coordinates of surface vertex tc(x) | tc(y) | tc(z) | Direction cosine of optical axis gx(x) | gx(y) | gx(z) |
|---|---|---|---|---|---|---|---|
| Light emitting point of first light source 10a | — | −14.08 | 160.91 | −7.62 | −0.09 | 1.00 | −0.05 |

TABLE 8-continued

| Optical surface | Refractive index (λ = 790 nm) | Coordinates of surface vertex tc(x) | tc(y) | tc(z) | Direction cosine of optical axis gx(x) | gx(y) | gx(z) |
|---|---|---|---|---|---|---|---|
| Incident surface of first incident optical element 20a | 1.53 | −11.15 | 127.48 | −6.03 | −0.09 | 1.00 | −0.05 |
| Exit surface of first incident optical element 20a | — | −10.89 | 124.50 | −5.89 | −0.09 | 1.00 | −0.05 |
| First sub-scanning stop 30a | — | −9.22 | 105.44 | −4.99 | −0.09 | 1.00 | 0.00 |
| First main scanning stop 40a | — | −6.97 | 79.70 | −3.77 | −0.09 | 1.00 | 0.00 |
| Deflecting surface 50a of deflecting unit 50 (when scanning on-axis image height) | — | 0.82 | 0.99 | 0.00 | −0.74 | 0.68 | 0.00 |
| Incident surface of upper portion 60au of first imaging optical element | 1.53 | −26.00 | 0.00 | 0.00 | −1.00 | 0.00 | 0.00 |
| Exit surface of upper portion 60au of first imaging optical element | — | −34.20 | 0.00 | 0.00 | −1.00 | 0.00 | 0.00 |
| Incident surface of second imaging optical element 80a | 1.53 | −100.80 | 0.00 | 5.96 | −1.00 | 0.00 | 0.00 |
| Exit surface of second imaging optical element 80a | — | −105.10 | 0.00 | 5.96 | −1.00 | 0.00 | 0.00 |
| Reflecting surface of first reflecting element 70a | — | −113.67 | 5.00 | 5.58 | −0.76 | 0.00 | 0.65 |
| First scanned surface 100a | — | −97.70 | 0.00 | −112.69 | −0.15 | 0.00 | 0.99 |
| Light emitting point of second light source 10b | — | −14.08 | 160.91 | 7.62 | −0.09 | 1.00 | 0.05 |
| Incident surface of second incident optical element 20b | 1.53 | −11.15 | 127.48 | 6.03 | −0.09 | 1.00 | 0.05 |
| Exit surface of second incident optical element 20b | — | −10.89 | 124.50 | 5.89 | −0.09 | 1.00 | 0.05 |
| Second sub-scanning stop 30b | — | −9.22 | 105.44 | 4.99 | −0.09 | 1.00 | 0.00 |
| Second main scanning stop 40b | — | −6.97 | 79.70 | 3.77 | −0.09 | 1.00 | 0.00 |
| Deflecting surface 50a of deflecting unit 50 (when scanning on-axis image height) | — | 0.82 | 0.99 | 0.00 | −0.74 | 0.68 | 0.00 |
| Incident surface of lower portion 60al of first imaging optical element | 1.53 | −26.00 | 0.00 | 0.00 | −1.00 | 0.00 | 0.00 |

TABLE 8-continued

| Optical surface | Refractive index (λ = 790 nm) | Coordinates of surface vertex tc(x) | tc(y) | tc(z) | Direction cosine of optical axis gx(x) | gx(y) | gx(z) |
|---|---|---|---|---|---|---|---|
| Exit surface of lower portion 60al of first imaging optical element | — | −34.20 | 0.00 | 0.00 | −1.00 | 0.00 | 0.00 |
| Incident surface of second imaging optical element 80b | 1.53 | −42.87 | 0.00 | −15.46 | −0.99 | 0.00 | 0.16 |
| Exit surface of second imaging optical element 80b | — | −38.63 | 0.00 | −16.15 | −0.99 | 0.00 | 0.16 |
| Reflecting surface of first reflecting element 70b | — | −81.82 | 0.00 | −4.68 | −1.00 | 0.00 | 0.08 |
| Reflecting surface of second reflecting element 90a | — | −28.10 | −4.50 | −17.47 | −0.70 | 0.00 | −0.71 |
| Second scanned surface 100b | — | −14.70 | 0.00 | −112.69 | 0.17 | 0.00 | −0.99 |
| Incident surface of synchronization detection lens 200 | 1.49 | −28.18 | 88.30 | 4.17 | −0.31 | 0.95 | 0.05 |
| Exit surface of synchronization detection lens 200 | — | −28.79 | 90.20 | 4.26 | −0.31 | 0.95 | 0.05 |
| Synchronization detection slit 210 | — | −51.52 | 160.15 | 7.73 | −0.09 | 1.00 | 0.00 |
| Synchronization detection sensor 220 | — | −52.14 | 162.04 | 7.83 | −0.09 | 1.00 | 0.00 |

TABLE 9-1

| | | Aspherical surface coefficient | | | | | |
|---|---|---|---|---|---|---|---|
| | | First incident optical element 20a | | Upper portion 60au of first imaging optical element | | Second imaging optical element 80a | |
| | Coefficient | Incident surface | Exit surface | Incident surface | Exit surface | Incident surface | Exit surface |
| Meridional line | R | — | −3.72E+01 | −7.20E+01 | −4.32E+01 | 4.00E+03 | 3.46E+02 |
| | K | — | — | 8.92E−01 | −5.70E−01 | — | −9.06E+01 |
| | B3 | — | — | — | — | — | — |
| | B4 | — | — | −7.61E−07 | −2.12E−07 | — | −2.16E−07 |
| | B5 | — | — | — | — | — | — |
| | B6 | — | — | 6.79E−09 | 1.67E−09 | — | 1.80E−11 |
| | B7 | — | — | — | — | — | — |
| | B8 | — | — | −5.89E−12 | 1.27E−12 | — | −1.08E−15 |
| | B9 | — | — | — | — | — | — |
| | B10 | — | — | 1.62E−15 | −1.43E−15 | — | 3.06E−20 |
| Sagittal line | r | — | −2.62E+01 | 2.00E+01 | 2.06E+01 | 2.68E+01 | 2.94E+02 |
| | E1 | — | — | — | — | — | −7.95E−07 |
| | E2 | — | — | — | 1.56E−05 | −5.14E−06 | −2.37E−06 |
| | E3 | — | — | — | — | — | −3.30E−09 |
| | E4 | — | — | — | −3.39E−08 | — | −2.46E−10 |
| | E5 | — | — | — | — | — | 1.49E−12 |
| | E6 | — | — | — | 3.96E−11 | — | 1.69E−14 |
| | E7 | — | — | — | — | — | −2.51E−16 |
| | E8 | — | — | — | −6.56E−14 | — | −1.80E−18 |
| | E9 | — | — | — | — | — | 1.42E−20 |

TABLE 9-1-continued

| | | Aspherical surface coefficient | | | | | |
|---|---|---|---|---|---|---|---|
| | | First incident optical element 20a | | Upper portion 60au of first imaging optical element | | Second imaging optical element 80a | |
| | Coefficient | Incident surface | Exit surface | Incident surface | Exit surface | Incident surface | Exit surface |
| | E10 | — | — | — | 5.40E−17 | — | 6.86E−23 |
| Additional term | M0_1 | — | — | — | −3.93E−02 | −1.51E−01 | 1.09E−02 |
| | M1_1 | — | — | — | — | −2.20E−05 | −9.67E−06 |
| | M2_1 | — | — | — | 3.68E−05 | −2.59E−05 | −3.99E−05 |
| | M3_1 | — | — | — | — | 1.31E−07 | 1.17E−07 |
| | M4_1 | — | — | — | — | 5.71E−09 | 7.94E−09 |
| | M5_1 | — | — | — | — | −3.85E−11 | −3.14E−11 |
| | M6_1 | — | — | — | — | 8.95E−14 | −6.61E−13 |
| | M7_1 | — | — | — | — | 5.08E−15 | 3.77E−15 |
| | M8_1 | — | — | — | — | −2.76E−17 | 8.31E−17 |
| | M9_1 | — | — | — | — | −2.34E−19 | −1.51E−19 |
| | M10_1 | — | — | — | — | −5.21E−22 | −5.65E−21 |
| | C3 | −8.67E−03 | — | — | — | — | — |
| | C5 | −7.85E−03 | — | — | — | — | — |

TABLE 9-2

| | | Aspherical surface coefficient | | | | | |
|---|---|---|---|---|---|---|---|
| | | Second incident optical element 20b | | Lower portion 60al of first imaging optical element | | Second imaging optical element 80b | |
| | Coefficient | Incident surface | Exit surface | Incident surface | Exit surface | Incident surface | Exit surface |
| Meridional line | R | — | −3.72E+01 | −7.20E+01 | −4.42E+01 | 4.00E+03 | −3.84E+02 |
| | K | — | — | 8.92E−01 | −1.15E+00 | — | −7.67E+01 |
| | B3 | — | — | — | — | — | — |
| | B4 | — | — | −7.61E−07 | −1.53E−06 | — | 1.34E−07 |
| | B5 | — | — | — | — | — | — |
| | B6 | — | — | 6.79E−09 | 1.77E−09 | — | −7.43E−12 |
| | B7 | — | — | — | — | — | — |
| | B8 | — | — | −5.89E−12 | 9.64E−13 | — | 3.32E−16 |
| | B9 | — | — | — | — | — | — |
| | B10 | — | — | 1.62E−15 | −1.19E−15 | — | −7.21E−21 |
| Sagittal line | r | — | −2.62E+01 | 2.00E+01 | 5.45E+01 | −4.61E+01 | 1.10E+02 |
| | E1 | — | — | — | — | — | 1.93E−06 |
| | E2 | — | — | — | 5.86E−06 | −1.37E−08 | −1.78E−06 |
| | E3 | — | — | — | — | — | 6.13E−10 |
| | E4 | — | — | — | 1.02E−07 | — | 2.81E−10 |
| | E5 | — | — | — | — | — | −1.78E−13 |
| | E6 | — | — | — | −2.91E−10 | — | −4.07E−14 |
| | E7 | — | — | — | — | — | 1.82E−17 |
| | E8 | — | — | — | 3.51E−13 | — | 3.25E−18 |
| | E9 | — | — | — | — | — | −5.54E−22 |
| | E10 | — | — | — | −1.62E−16 | — | −1.00E−22 |
| Additional term | M0_1 | — | — | — | 1.12E−01 | −1.49E−01 | 7.95E−02 |
| | M1_1 | — | — | — | — | −1.94E−05 | −8.17E−06 |
| | M2_1 | — | — | — | −3.73E−05 | −2.65E−07 | −1.51E−05 |
| | M3_1 | — | — | — | — | 4.97E−08 | 4.53E−08 |
| | M4_1 | — | — | — | — | −5.01E−10 | 1.81E−09 |
| | M5_1 | — | — | — | — | −1.01E−11 | −8.59E−12 |
| | M6_1 | — | — | — | — | 2.09E−13 | −1.65E−13 |
| | M7_1 | — | — | — | — | 9.58E−16 | 7.72E−16 |
| | M8_1 | — | — | — | — | −2.64E−18 | 2.41E−17 |
| | M9_1 | — | — | — | — | −2.84E−20 | −1.97E−20 |
| | M10_1 | — | — | — | — | 7.55E−23 | −4.46E−22 |
| | C3 | −8.67E−03 | — | — | — | — | — |
| | C5 | −7.85E−03 | — | — | — | — | — |

TABLE 9-3

| Aspherical surface coefficient | | |
|---|---|---|
| | Synchronization detection lens 200 | |
| Coefficient | Incident surface | Exit surface |
| Curvature radius of meridional line R | 3.79E+01 | — |
| Curvature radius of sagittal line r | 3.79E+01 | −4.50E+01 |

Figure 14A:
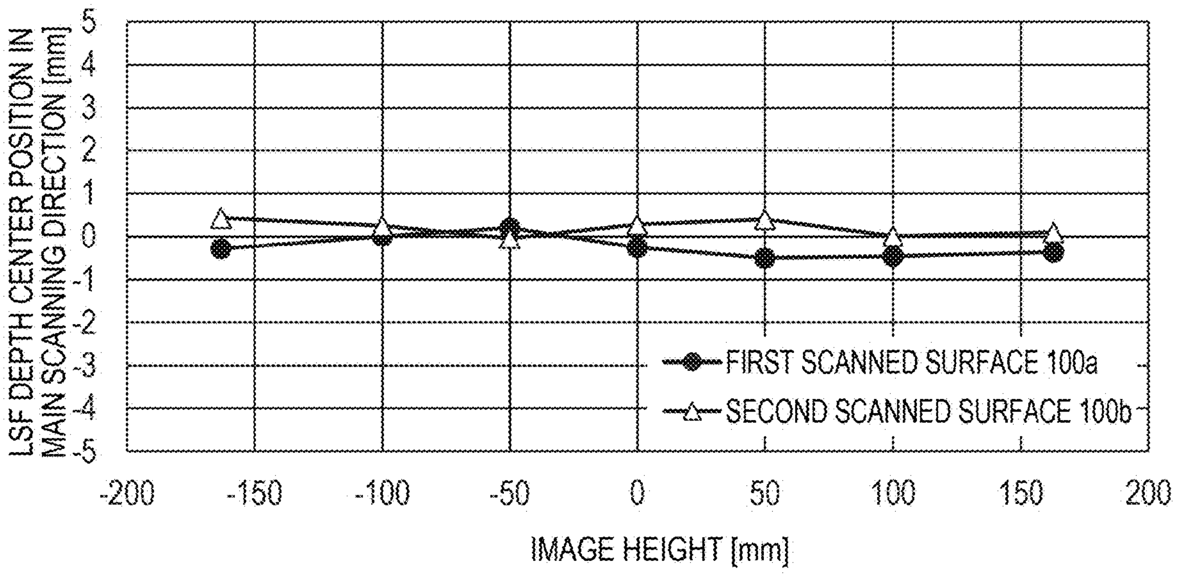
FIG. 14A is a view showing an image height dependence of the LSF depth center position in the main scanning direction on each scanned surface in the light scanning apparatus according to the third embodiment.
Figure 14B:
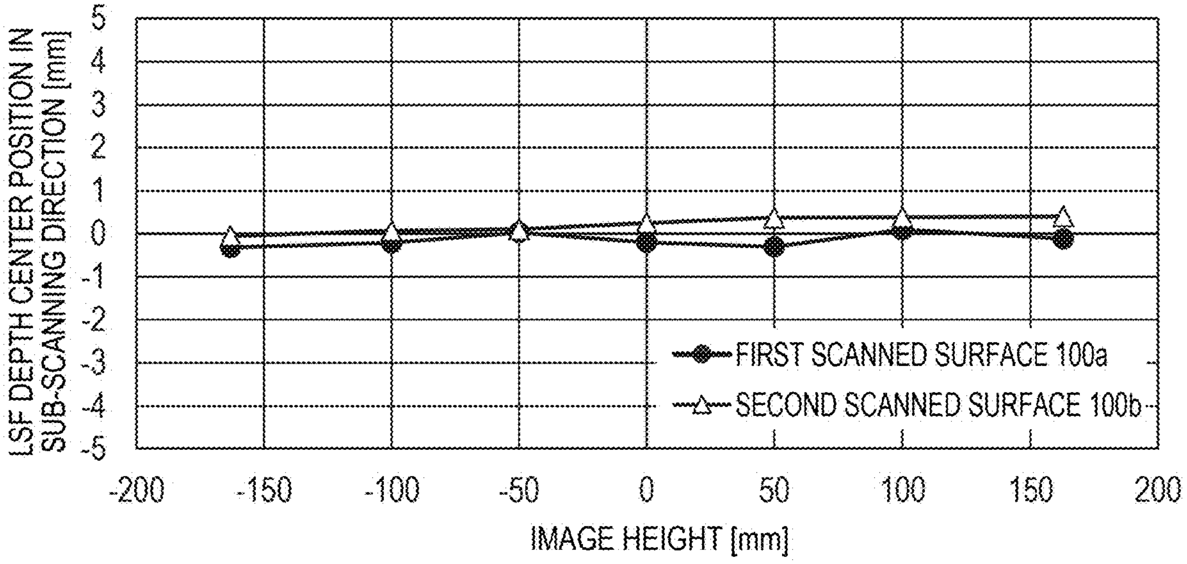
FIG. 14B is a view showing an image height dependence of the LSF depth center position in the sub-scanning direction on each scanned surface in the light scanning apparatus according to the third embodiment.

FIGS. 14A and 14B show image height dependencies of the LSF depth center position in the main scanning direction and the LSF depth center position in the sub-scanning direction on each scanned surface in the light scanning apparatus 301 according to the present embodiment, respectively.

As shown in FIGS. 14A and 14B, both of the LSF depth center position in the main scanning direction and the LSF depth center position in the sub-scanning direction are within the range of +1 mm over the entire image height, so that it can be seen that the light scanning apparatus 301 according to the present embodiment achieves a favorable imaging performance.

In the light scanning apparatus 301 according to the present embodiment, DP/W is obtained as 0.28, so that the inequality (5) is satisfied.

Since $\theta_{im}$ is 1.48, the inequalities (6) and (6a) are satisfied.

$\theta_{bd}/\theta_{im}$ is obtained as 0.85, so that the inequalities (7) and (7a) are satisfied.

$F_{bd}/D_{bd}$ is obtained as 0.46, so that the inequalities (8) and (8a) are satisfied.

$X_m/X_{bd}$ is obtained as 1.00, so that the inequalities (9) and (9a) are satisfied.

As described above, in the light scanning apparatus 301 according to the present embodiment, the deflecting unit 50 and the synchronization detection lens 200 are provided on sides opposite to each other with respect to the bottom surface 2*a* of the housing 2.

Thereby, it is possible to reduce the size in the direction perpendicular to each of the main scanning direction and the sub-scanning direction, namely in the optical axis directions of the first to fourth imaging optical systems 85*a* to 85*d* in the light scanning apparatus 301 according to the present embodiment.

Table 10 below shows the relationship between numerical values and inequalities in each of the light scanning apparatuses according to the first to third embodiments.

TABLE 10

| | Inequalities | First embodiment | Second embodiment | Third embodiment |
|---|---|---|---|---|
| (5) | $0.25 \leq DP/W \leq 0.30$ | 0.25 | 0.25 | 0.28 |
| (6) | $1.00 < \theta_{im} < 1.50$ | 1.36 | 1.36 | 1.48 |
| (6a) | $1.20 < \theta_{im} < 1.50$ | | | |
| (7) | $0.80 < \theta_{bd}/\theta_{im} < 0.95$ | 0.91 | 0.88 | 0.85 |
| (7a) | $0.84 < \theta_{bd}/\theta_{im} < 0.95$ | | | |
| (8) | $0.30 < F_{bd}/D_{bd} < 0.70$ | 0.37 | 0.32 | 0.46 |
| (8a) | $0.30 < F_{bd}/D_{bd} < 0.50$ | | | |
| (9) | $0.60 < X_m/X_{bd} < 1.50$ | 0.84 | 0.77 | 1.00 |
| (9a) | $0.70 < X_m/X_{bd} < 1.20$ | | | |

According to the present embodiments, a light scanning apparatus having a small size and a simple configuration can be provided.

[Image Forming Apparatus]

Figure 15:
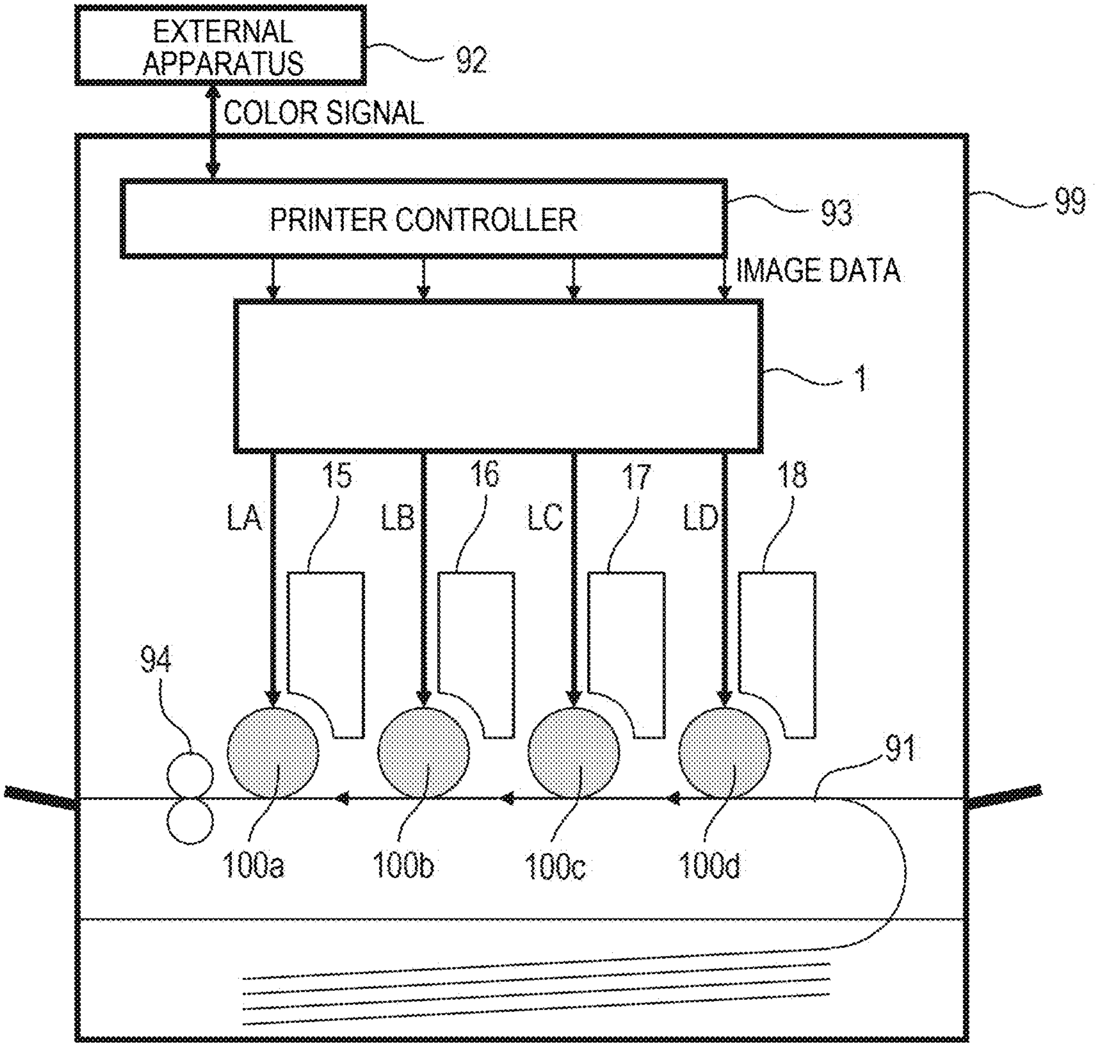
FIG. 15 is a sub-scanning cross sectional view of a main part of an image forming apparatus according to the present embodiments.

FIG. 15 shows a sub-scanning cross sectional view of a main part of an image forming apparatus 99 including the light scanning apparatus 1 according to any one of the first to third embodiments.

The image forming apparatus 99 is a tandem-type color image forming apparatus in which the light scanning apparatus 1 according to any one of the first to third embodiments records image information on surfaces of four photosensitive drums serving as image bearing members.

The image forming apparatus 99 includes the light scanning apparatus 1 according to any one of the first to third embodiments, and first, second, third and fourth photosensitive drums 100*a*, 100*b*, 100*c* and 100*d* as image bearing members.

Further, the image forming apparatus 99 includes first, second, third and fourth developing units 15, 16, 17 and 18, a conveying belt 91, a printer controller 93, and a fixing unit 94.

As shown in FIG. 15, color signals of R (red), G (green) and B (blue) output from an external apparatus 92 such as a personal computer are input to the image forming apparatus 99.

Then, the input color signals are converted into image data (dot data) of C (cyan), M (magenta), Y (yellow) and K (black) by a printer controller 93 in the apparatus.

Next, the converted image data is input to the light scanning apparatus 1 according to any one of the first to third embodiments.

Then, the photosensitive surfaces of the first to fourth photosensitive drums 100*a* to 100*d* are scanned in the main scanning direction by the first, second, the third and fourth light fluxes LA, LB, LC and LD modulated according to each image data and emitted from the light scanning apparatus 1, respectively.

Charging rollers (not shown) for uniformly charging the surfaces of the first to fourth photosensitive drums 100*a* to 100*d* are provided so as to abut on the surfaces.

Then, the surfaces of the first to fourth photosensitive drums 100*a* to 100*d* charged by the charging rollers are irradiated with the first to fourth light fluxes LA to LD by the light scanning apparatus 1.

As described above, the first to fourth light fluxes LA to LD are modulated based on image data of each color, and electrostatic latent images are formed on the surfaces of the first to fourth photosensitive drums 100*a* to 100*d* by irradiating the surfaces with the first to fourth light fluxes LA to LD, respectively.

Then, the formed electrostatic latent images are developed as toner images by the first to fourth developing units 15 to 18 arranged so as to abut on the first to fourth photosensitive drums 100*a* to 100*d*, respectively.

Next, the developed toner images are multiply transferred onto a sheet (a transferred material) (not shown) conveyed on the conveying belt 91 by transferring rollers (a transferring unit) (not shown) arranged so as to face the first to fourth photosensitive drums 100*a* to 100*d*. Thereby, one full-color image is formed on the sheet.

Then, the sheet on which the unfixed toner image is transferred is further conveyed to a fixing unit 94 provided on a downstream side (on the left side in FIG. 15) of the first to fourth photosensitive drums 100*a* to 100*d* by the conveying belt 91.

The fixing unit 94 includes a fixing roller having a fixing heater (not shown) therein and a pressurizing roller arranged so as to come into pressure contact with the fixing roller.

Then, the sheet conveyed by the conveying belt 91 is heated while being pressed by a pressure contact portion between the fixing roller and the pressurizing roller to fix the unfixed toner image on the sheet.

Further, a sheet discharging roller (not shown) is arranged at a downstream side of the fixing unit 94, and the sheet discharging roller discharges the fixed sheet to the outside of the image forming apparatus 99.

In the image forming apparatus 99, image signals (image information) are recorded on photosensitive surfaces of first to fourth photosensitive drums 100*a* to 100*d* corresponding to respective colors of C (cyan), M (magenta), Y (yellow) and K (black) by the light scanning apparatus 1. Thereby, a color image can be printed at a high speed.

As the external apparatus 92, a color image reading apparatus including a CCD sensor may be used, for example.

In this case, a color digital copying machine is formed by the color image reading apparatus and the image forming apparatus 99.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-166647, filed Sep. 28, 2023, which is hereby incorporated by reference herein in its entirety.

What is claimed is:

1. A light scanning apparatus, comprising:

a deflecting unit configured to deflect first and second light fluxes to scan first and second scanned surfaces in a main scanning direction, respectively;

a first imaging optical system configured to guide the first light flux deflected by the deflecting unit to the first scanned surface;

a second imaging optical system configured to guide the second light flux deflected by the deflecting unit to the second scanned surface;

a light receiving element configured to receive the first light flux deflected by the deflecting unit without the first imaging optical system;

a first optical element configured to guide the first light flux deflected by the deflecting unit to the light receiving element; and a holding member configured to hold the deflecting unit, the first imaging optical system, the second imaging optical system, the light receiving element and the first optical element, wherein the first optical element and the deflecting unit are arranged on sides opposite to each other with respect to a first surface of the holding member, and wherein a following condition is satisfied:

$$0.25 \leq DP/W \leq 0.30$$

where DP represents a distance between a first intersecting point of the first scanned surface and an optical axis of the first imaging optical system, and a second intersecting point of the second scanned surface and an optical axis of the second imaging optical system, and W represents a scanning width on each of the first and second scanned surfaces.

2. The light scanning apparatus according to claim 1, wherein the deflecting unit is configured to deflect the first and second light fluxes by a first deflecting surface.

3. The light scanning apparatus according to claim 2, wherein the second scanned surface is arranged between the deflecting unit and the first scanned surface in a first direction parallel to a straight line passing through the first and second intersecting points.

4. The light scanning apparatus according to claim 2, wherein a following condition is satisfied:

$$0.60 < X_m/X_{bd} < 1.50$$

where $X_{bd}$ represents a distance between a center of the deflecting unit and a center of an incident surface of the first optical element in a first direction parallel to a straight line passing through the first and second intersecting points, and $X_m$ represents a distance in the first direction between the center of the deflecting unit and a center of an incident surface of a second optical element arranged closest to the deflecting unit among optical elements provided on optical paths of the first and second light fluxes deflected by the deflecting unit.

5. The light scanning apparatus according to claim 1, further comprising a reflecting element configured to guide the first light flux deflected by the deflecting unit to the first scanned surface, wherein the holding member is configured to hold the reflecting element, and wherein the first optical element and the reflecting element are arranged on sides opposite to each other with respect to the first surface of the holding member.

6. The light scanning apparatus according to claim 1, wherein the first optical element and the first imaging optical system are arranged on sides opposite to each other with respect to the first surface of the holding member.

7. The light scanning apparatus according to claim 1, wherein the first optical element is configured to condense the first light flux deflected by the deflecting unit on a light receiving surface of the light receiving element.

8. The light scanning apparatus according to claim 1, further comprising a controller configured to control a light emission timing of a light source for emitting the first light flux based on a signal from the light receiving element.

9. The light scanning apparatus according to claim 1, wherein the holding member is configured to hold an upper surface of the first optical element.

10. The light scanning apparatus according to claim 1, wherein the light receiving element and the deflecting unit are arranged on sides opposite to each other with respect to a second surface of the holding member.

11. The light scanning apparatus according to claim 1, wherein the light receiving element and the first optical element are arranged on sides opposite to each other with respect to a second surface of the holding member.

12. The light scanning apparatus according to claim 1, wherein a following condition is satisfied:

$$0.30 < F_{bd}/D_{bd} < 0.70$$

where $D_{bd}$ represents a distance on an optical axis of the first optical element between the light receiving element and a deflection point of the deflecting unit for a principal ray of the first light flux, and $F_{bd}$ represents a focal length in a main scanning cross section of the first optical element.

13. The light scanning apparatus according to claim 1, further comprising an incident optical system configured to cause the first light flux to be incident on the deflecting unit, wherein a following condition is satisfied:

$$1.00<\theta_{im}<1.50$$

where $\theta_{im}$ (radian) represents an angle formed by an optical axis of the incident optical system and an optical axis of the first imaging optical system when they are projected on a main scanning cross section.

14. The light scanning apparatus according to claim 1, further comprising an incident optical system configured to cause the first light flux to be incident on the deflecting unit, wherein a following condition is satisfied:

$$0.80<\theta_{bd}/\theta_{im}<0.95$$

where $\theta_{im}$ represents an angle formed by an optical axis of the incident optical system and an optical axis of the first imaging optical system when they are projected on a main scanning cross section, and $\theta_{bd}$ represents an angle formed by an optical axis of the first optical element and the optical axis of the first imaging optical system when they are projected in the main scanning cross section.

15. The light scanning apparatus according to claim 1, further comprising third and fourth imaging optical systems configured to guide third and fourth light fluxes deflected by the deflecting unit to third and fourth scanned surfaces, respectively, wherein the deflecting unit is configured to deflect the third and fourth light fluxes to scan the third and fourth scanned surfaces in the main scanning direction, respectively, wherein the first and second light fluxes are obliquely incident on a first deflecting surface of the deflecting unit at different angles from each other with respect to a main scanning section in a sub-scanning cross section, and wherein the third and fourth light fluxes are obliquely incident on a second deflecting surface of the deflecting unit at different angles from each other with respect to the main scanning section in the sub-scanning section.

16. An image forming apparatus, comprising:

the light scanning apparatus according to claim 1;

a developing unit configured to develop an electrostatic latent image formed on the first scanned surface by the light scanning apparatus as a toner image;

a transferring unit configured to transfer the developed toner image to a transferred material; and a fixing unit configured to fix the transferred toner image to the transferred material.

17. An image forming apparatus, comprising:

the light scanning apparatus according to claim 1; and a printer controller configured to convert a signal output from an external apparatus into image data to input the image data to the light scanning apparatus.

18. A light scanning apparatus, comprising:

a deflecting unit configured to deflect first and second light fluxes to scan first and second scanned surfaces in a main scanning direction, respectively, by a first deflecting surface;

a first imaging optical system configured to guide the first light flux deflected by the first deflecting surface to the first scanned surface;

a second imaging optical system configured to guide the second light flux deflected by the first deflecting surface to the second scanned surface;

a light receiving element configured to receive the first light flux deflected by the first deflecting surface without the first imaging optical system;

a first optical element configured to guide the first light flux deflected by the first deflecting surface to the light receiving element; and a holding member configured to hold the deflecting unit, the first imaging optical system, the second imaging optical system, the light receiving element and the first optical element, wherein the first optical element and the deflecting unit are arranged on sides opposite to each other with respect to a first surface of the holding member, and wherein a following condition is satisfied:

$$0.60<X_m/X_{bd}<1.50$$

where $X_{bd}$ represents a distance between a center of the deflecting unit and a center of an incident surface of the first optical element in a first direction parallel to a straight line passing through a first intersecting point of the first scanned surface and an optical axis of the first imaging optical system, and a second intersecting point of the second scanned surface and an optical axis of the second imaging optical system, and $X_m$ represents a distance in the first direction between the center of the deflecting unit and a center of an incident surface of a second optical element arranged closest to the deflecting unit among optical elements provided on optical paths of the first and second light fluxes deflected by the first deflecting surface.

19. A light scanning apparatus, comprising:

a deflecting unit configured to deflect a first light flux to scan a first scanned surface in a main scanning direction;

a first imaging optical system configured to guide the first light flux deflected by the deflecting unit to the first scanned surface;

a light receiving element configured to receive the first light flux deflected by the deflecting unit without the first imaging optical system;

a first optical element configured to guide the first light flux deflected by the deflecting unit to the light receiving element; and a holding member configured to hold the deflecting unit, the first imaging optical system, the light receiving element and the first optical element, wherein the first optical element and the deflecting unit are arranged on sides opposite to each other with respect to a first surface of the holding member, and wherein a following condition is satisfied:

$$0.30<F_{bd}/D_{bd}<0.70$$

where $D_{bd}$ represents a distance on an optical axis of the first optical element between the light receiving element and a deflection point of the deflecting unit for a principal ray of the first light flux, and $F_{bd}$ represents a focal length in a main scanning cross section of the first optical element.

* * * * *